(12) United States Patent
Ghanbarinejad et al.

(10) Patent No.: US 10,797,810 B2
(45) Date of Patent: Oct. 6, 2020

(54) SYSTEM AND METHOD FOR COMMUNICATIONS WITH MULTI-ANTENNA PANEL DEVICES

(71) Applicant: Futurewei Technologies, Inc., Plano, TX (US)

(72) Inventors: Majid Ghanbarinejad, Chicago, IL (US); Philippe Sartori, Plainfield, IL (US); Murali Narasimha, Lake Oswego, OR (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/107,326

(22) Filed: Aug. 21, 2018

(65) Prior Publication Data

US 2020/0067615 A1 Feb. 27, 2020

(51) Int. Cl.
  *H04B 7/06* (2006.01)
  *H04B 17/382* (2015.01)
  *H04B 7/0408* (2017.01)
  *H04B 17/10* (2015.01)

(52) U.S. Cl.
  CPC ......... *H04B 17/382* (2015.01); *H04B 7/0408* (2013.01); *H04B 7/0626* (2013.01); *H04B 17/104* (2015.01); *H04B 7/0617* (2013.01)

(58) Field of Classification Search
  CPC .. H04B 17/382; H04B 17/104; H04B 7/0626; H04B 7/0408; H04B 7/0617; H04B 7/0404; H04B 7/0695; H04B 7/0691
  See application file for complete search history.

(56) References Cited

U.S. PATENT DOCUMENTS

| | | | |
|---|---|---|---|
| 2012/0176939 A1* | 7/2012 | Qu | H04L 5/0048 370/255 |
| 2018/0109304 A1* | 4/2018 | Wiberg | H04B 7/0617 |
| 2018/0198499 A1* | 7/2018 | Park | H04B 7/04 |
| 2018/0249526 A1* | 8/2018 | Nagaraja | H04W 76/19 |
| 2018/0309526 A1* | 10/2018 | Zhang | H04B 7/0617 |
| 2018/0368205 A1* | 12/2018 | Park | H04L 5/0048 |
| 2019/0053193 A1* | 2/2019 | Park | H04B 7/04 |
| 2019/0058532 A1* | 2/2019 | Nagaraja | H04W 24/08 |
| 2019/0081753 A1* | 3/2019 | Jung | H04B 7/0617 |

(Continued)

FOREIGN PATENT DOCUMENTS

| | | |
|---|---|---|
| CN | 107294588 A | 10/2017 |
| CN | 108288991 A | 7/2018 |
| WO | 2018031873 A1 | 2/2018 |

OTHER PUBLICATIONS

3rd Generation Partnership Project; Technical Specification Group Radio Access Network; NR; Physical channels and modulation, (Release 15), 3GPP TS 38211, V15.2.0, Jun. 2018, 93 pages.

(Continued)

*Primary Examiner* — Kenneth T Lam
(74) *Attorney, Agent, or Firm* — Slater Matsil, LLP

(57) ABSTRACT

A method for operating a user equipment with multi-beam communication capability includes performing measurements in accordance with received reference signals, and determining that at least one antenna panel is unused, wherein the determining is in accordance with the measurements, and based thereon, reporting an availability of the at least one antenna panel.

27 Claims, 7 Drawing Sheets

(56) References Cited

U.S. PATENT DOCUMENTS

2019/0082363 A1* 3/2019 Park ................ H04W 80/02
2019/0132066 A1* 5/2019 Park ................ H04W 36/0094
2019/0230545 A1* 7/2019 Liou ................ H04W 24/10

OTHER PUBLICATIONS

"3rd Generation Partnership Project; Technical Specification Group Radio Access Network; NR; Multiplexing and channel coding, (Release 15)," 3GPP TS 38.212, V15.2.0, Jun. 2018, 94 pages.
"3rd Generation Partnership Project; Technical Specification Group Radio Access Network; NR; Physical layer procedures for control (Release 15)," 3GPP TS 38.213, V15.2.0, Jun. 2018, 98 pages.
"3rd Generation Partnership Project; Technical Specification Group Radio Access Network; NR; Physical layer procedures for data (Release 15)," 3GPP TS 38.2514, V15.2.0, Jun. 2018, 95 pages.
"3rd Generation Partnership Project; Technical Specification Group Radio Access Network; NR; Physical layer measurements, (Release 15)," 3GPP TS 38.215, V15.2.0, Jun. 2018, 15 pages.

* cited by examiner

SYSTEM AND METHOD FOR COMMUNICATIONS WITH MULTI-ANTENNA PANEL DEVICES

TECHNICAL FIELD

The present disclosure relates generally to a system and method for digital communications, and, in particular embodiments, to a system and method for communications with multi-antenna panel devices.

BACKGROUND

Communications systems currently being standardized, such as Third Generation Partnership Project (3GPP) New Radio (NR) radio access technology compliant communications systems, are targeting operation at high frequencies, such as frequencies greater than 6 Gigahertz (GHz), also known as millimeter wave (mmWave) frequencies. Operating at high frequencies may be advantageous because of the large amount of available spectrum and much higher throughputs afforded thereby, when compared to conventional sub-6 GHz frequencies.

However, communications in the high frequencies offers new challenges. In particular, the path loss at high frequencies is higher than at the conventional frequencies. In order to combat path loss, beamforming is used. Beamforming is achieved through a combination of analog beamforming and digital beamforming. Analog beams are generated using radio frequency (RF) circuitry, with digital beamforming being applied on top of the beams generated by the analog beamformers. This is a paradigm change from conventional cellular communications systems where all beamforming is performed in the digital domain. With analog beamforming, the maximum number of simultaneous beams may be determined by the number of antenna panels (or simply panels). In this context, an antenna panel may comprise multiple antenna elements and phase shifters that operate to generate a beam.

A user equipment (UE) may communicate with multiple transmit-receive points (TRPs) in a simultaneous or near-simultaneous way. As an example, data may be received from more than one TRP to increase the data rate or to reduce the probability of losing a connection with the network. In addition, a UE may have to make measurements for multiple TRPs in order to maintain a list of neighbor TRPs and prepare for handoffs, for example. A typical low-end UE may have at most two antenna panels, while a high-end UE may still not have more than four antenna panels. Therefore, it is imperative that a UE uses its antenna panels in as efficient a manner as possible.

SUMMARY

Example embodiments provide a system and method for communications with multi-antenna panel devices.

In accordance with an example embodiment, a computer implemented method for operating a user equipment (UE) is provided. The method includes performing, by the UE, measurements in accordance with received reference signals, and reporting, by the UE, an availability of at least one antenna panel, wherein a determining of the availability of the at least one antenna panel is in accordance with the measurements.

Optionally, in any of the preceding embodiments, an embodiment further includes receiving, by the UE, an instruction on use of the at least one antenna panel, and operating, by the UE, the at least one antenna panel in accordance with the received instruction.

Optionally, in any of the preceding embodiments, an embodiment wherein the instruction is received from a first access node, and wherein operating the at least one antenna panel comprises measuring signals from a second access node.

Optionally, in any of the preceding embodiments, an embodiment wherein the measurements comprise at least one of channel measurements, interference measurements, or beam measurements.

Optionally, in any of the preceding embodiments, an embodiment further includes reporting, by the UE, at least one of the measurements.

Optionally, in any of the preceding embodiments, an embodiment wherein the at least one antenna panel is associated with the at least one of the measurements.

Optionally, in any of the preceding embodiments, an embodiment wherein the availability of the at least one antenna panel and the at least one of the measurements are reported in a message.

Optionally, in any of the preceding embodiments, an embodiment further includes receiving, by the UE, a request to report the availability of the at least one antenna panel.

Optionally, in any of the preceding embodiments, an embodiment further includes reporting, by the UE, a number of antenna panels at the UE as a capability.

Optionally, in any of the preceding embodiments, an embodiment wherein reporting the number of antenna panels comprises sending the number of antenna panels in a radio resource control (RRC) message.

Optionally, in any of the preceding embodiments, an embodiment wherein reporting the availability of the at least one antenna panel comprises sending the availability of the at least one antenna panel in at least one of a physical uplink shared channel (PUSCH) or a physical uplink control channel (PUCCH).

In accordance with an example embodiment, a computer-implemented method for operating a first access node is provided. The method includes receiving, by the first access node, a report of an availability of at least one antenna panel at a UE, and sending, by the first access node, an instruction on use of the at least one antenna panel.

Optionally, in any of the preceding embodiments, an embodiment further includes sending, by the first access node, a request to report the availability of the at least one antenna panel at the UE.

Optionally, in any of the preceding embodiments, an embodiment wherein the request is associated with a reporting of measurements of signals transmitted by the first access node.

Optionally, in any of the preceding embodiments, an embodiment wherein the measurements comprise at least one of channel measurements, interference measurements, or beam measurements.

Optionally, in any of the preceding embodiments, an embodiment further includes receiving, by the first access node, a report of at least one of the measurements.

Optionally, in any of the preceding embodiments, an embodiment wherein the at least one antenna panel is associated with the at least one of the measurements.

Optionally, in any of the preceding embodiments, an embodiment wherein the availability of the at least one antenna panel and the at least one of the measurements are reported in a message.

Optionally, in any of the preceding embodiments, an embodiment further includes sending, by the access node, reference signals.

Optionally, in any of the preceding embodiments, an embodiment wherein the use of the at least one antenna panel comprises measuring signals transmitted by a second access node.

Optionally, in any of the preceding embodiments, an embodiment wherein the report is received in a physical uplink shared channel (PUSCH) or a physical uplink control channel (PUCCH).

Optionally, in any of the preceding embodiments, an embodiment further includes receiving, by the first access node, a report of a number of antenna panels at the UE as a capability.

Optionally, in any of the preceding embodiments, an embodiment wherein the report of the number of antenna panels is received in an RRC message.

In accordance with an example embodiment, a UE is provided. The UE includes a non-transitory memory storage comprising instructions, and one or more processors in communication with the memory storage. The one or more processors execute the instructions to perform measurements in accordance with received reference signals, and report an availability of the at least one antenna panel, wherein a determining of the availability of the at least one antenna panel is in accordance with the measurements.

Optionally, in any of the preceding embodiments, an embodiment wherein the one or more processors further execute the instructions to receive an instruction on use of the at least one antenna panel, and operate the at least one antenna panel in accordance with the received instruction.

Optionally, in any of the preceding embodiments, an embodiment wherein the one or more processors further execute the instructions to report at least one of the measurements.

Optionally, in any of the preceding embodiments, an embodiment wherein the one or more processors further execute the instructions to receive a request to report the availability of the at least one antenna panel.

Optionally, in any of the preceding embodiments, an embodiment wherein the one or more processors further execute the instructions to report a number of antenna panels at the UE as a capability.

In accordance with an example embodiment, an access node is provided. The access node includes a non-transitory memory storage comprising instructions, and one or more processors in communication with the memory storage. The one or more processors execute the instructions to receive a report of an availability of at least one antenna panel at a UE, and send an instruction on use of the at least one antenna panel.

Optionally, in any of the preceding embodiments, an embodiment wherein the one or more processors further execute the instructions to send a request to report the availability of the at least one antenna panel at the UE.

Optionally, in any of the preceding embodiments, an embodiment wherein the request is associated with a reporting of measurements of signals transmitted by the access node, and wherein the one or more processors further execute the instructions to receive a report of at least one of the measurements.

Optionally, in any of the preceding embodiments, an embodiment wherein the request is associated with a reporting of measurements of signals transmitted by the access node, and wherein the one or more processors further execute the instructions to send reference signals.

Optionally, in any of the preceding embodiments, an embodiment wherein the one or more processors further execute the instructions to receive a report of a number of antenna panels at the UE as a capability.

Practice of the foregoing embodiments enables antenna panels that are not required for an active connection to be used to perform other tasks, such as making measurements, establish an additional data connection to increase data rate, and so on.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
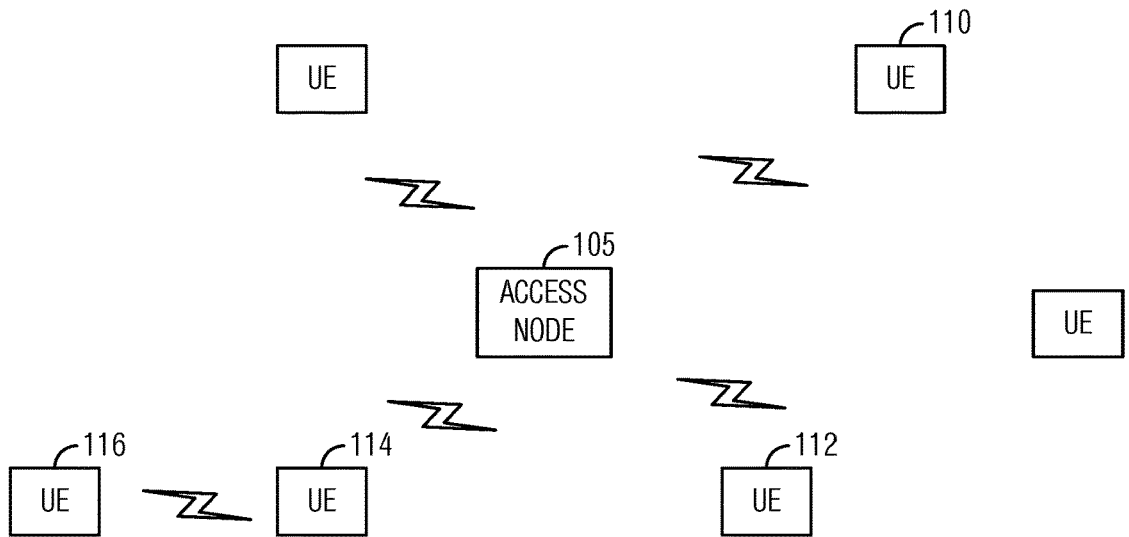
FIG. 1 illustrates an example wireless communications system according to example embodiments described herein.

FIG. 1 illustrates an example wireless communications system loft Communications system 100 includes an access node 105 serving a plurality of UEs, including UEs 110, 112, 114, and 116. In a cellular operating mode, communications to and from the plurality of UEs go through access node 105, while in device to device communications mode, such as proximity services (ProSe) operating mode, for example, direct communication between UEs is possible. Access nodes may also be commonly referred to as Node-Bs, evolved Node-Bs (eNBs), next generation (NG) Node-Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., long term evolution (LTE), LTE advanced (LTE-A), 5G, 5G LTE, 5G NR, High Speed Packet Access (HSPA), Wi-Fi 802.11a/b/g/n/ac/ad/ax/ay, etc. While it is understood that communications systems may employ multiple eNBs capable of communicating with a number of UEs, only one eNB and a number of UEs are illustrated for simplicity.

A feature of Third Generation Partnership Project (3GPP) New Radio (NR) radio access technology (also commonly referred to as Fifth-Generation (5G) NR) is the possibility of operating in a wider range of frequencies compared to earlier cellular wireless standards, such as 3GPP Long Term Evolution (LTE). In general, frequencies below a threshold frequency (typically around 6 GHz) are referred to as low frequency (LF) and frequencies above the threshold frequency are referred to as high frequency (HF). In 3GPP NR, a range of LF is called frequency range 1 (FR1) and a range of HF is called frequency range 2 (FR2).

Transmissions at HF suffer higher path loss than those at LF and motivate the use of directional antennas, for example, through radio frequency (RF) analog beamforming (ABF) for transmission or reception of radio signals. In this approach, an antenna array (also commonly referred to as an array of antennas or antenna elements) is connected to a single RF chain that provides a single stream of signal samples from or to the baseband. Analog beamforming is then realized by applying phase shifts that direct a beam to different directions. When multiple antenna arrays and RF chains are employed, beamforming can be applied in both analog and digital domains, providing the possibility of hybrid beamforming (HBF). It is noted that these concepts are applicable to both transmission and reception.

Analog and hybrid beamforming reduce complexity of hardware implementation and channel state information (CSI) acquisition compared to a fully digital beamforming (DBF) implementation at the cost of limitations that they introduce. An example limitation introduced by analog and hybrid beamforming in practice is the spatial constraints imposed by analog beamforming, i.e., analog beams limit a maximum number of directions to or from which signals can be received to the number of RF chains or the number of antenna panels with distinct phase-shifter controllers.

It is, however, important for perceiving the concept of a direction that factors such as the hardware implementation and impairments, the scattering environment, and so forth, may not always allow to directly associate a geometric direction to a beamforming direction. In other words, it is possible to transmit or receive beams to or from different angularly separated directions while perceiving from the beamforming point of view that a signal is transmitted or received to or from one direction. In the context of directional communication through phased antenna arrays, a direction or a beam corresponds to a state of phase shifts at a transmitting or receiving antenna array. Nevertheless, beam and direction may be used interchangeably in the remainder of this discussion. Beamforming in general, and analog beamforming in particular, whether at a transmit side or at a receive side, may also be called spatial filtering as it may amplify signals to or from certain spatial directions and may attenuate signals to or from other spatial directions.

Figure 2B:
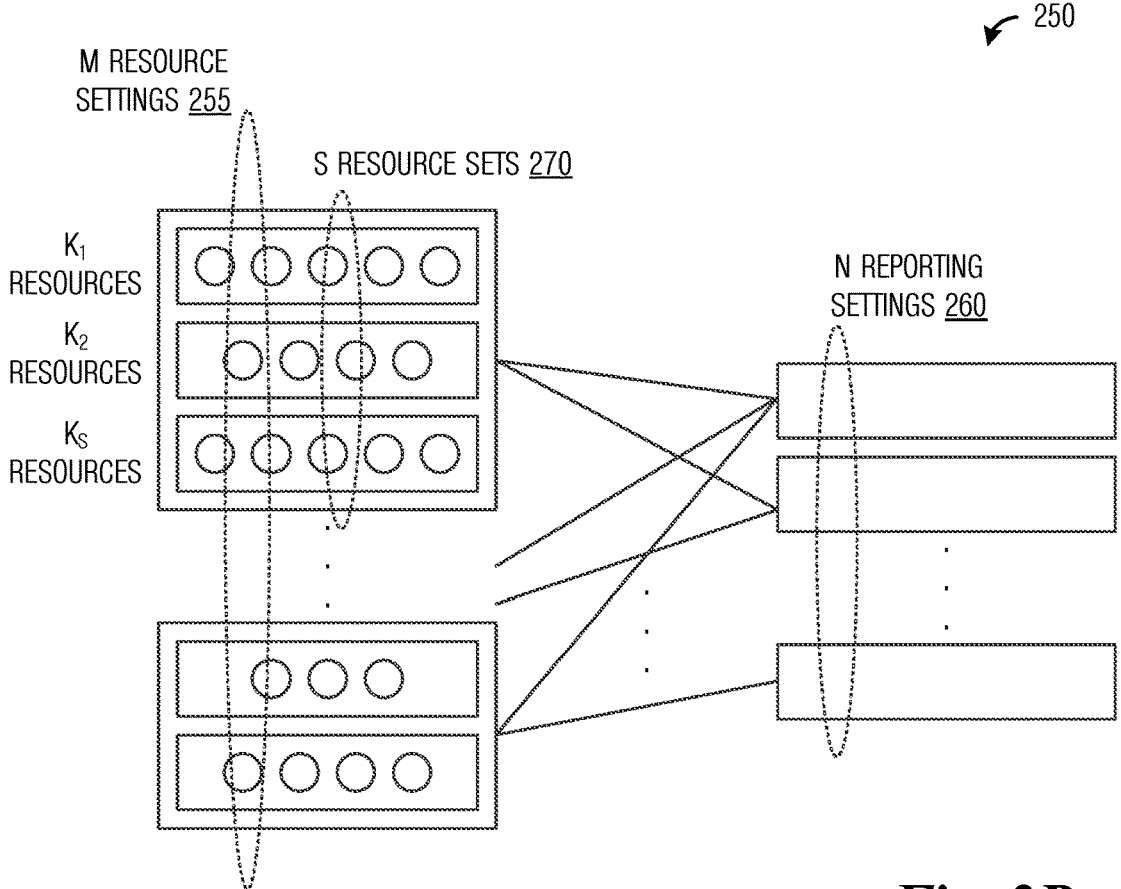
FIG. 2B illustrates a CSI framework.
Figure 2A:
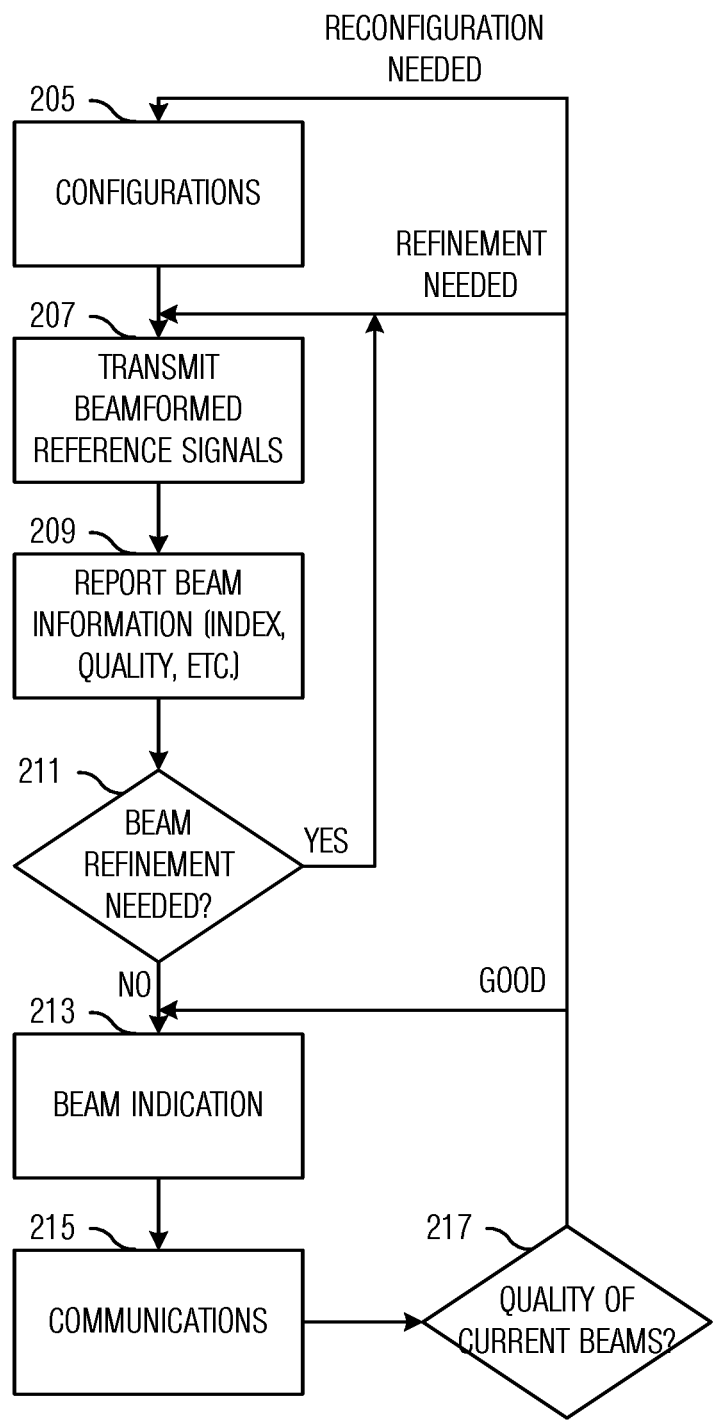
FIG. 2A illustrates a flow diagram of example operations occurring in beam management.

FIG. 2A illustrates a flow diagram of example operations 200 occurring in a beam management process. Typically, training a communications system to properly perform beamforming (e.g., apply beams to or from proper directions or applying beams through proper antennas) involves mechanisms shown in FIG. 2A. The example embodiments presented herein, however, are not limited to what is described here and may be extended to a wide range of beam management (BM) systems and methods. Therefore, the discussion presented herein should not be construed as being limiting to the scope or spirit of the example embodiments.

A first device, such as a network controller, produces and transmits configurations (block 205). A second device, such as a network entity, transmits beamformed reference signals (RSs) for downlink beam training or a third device, such as a UE, transmits beamformed RSs for uplink beam training (block 207). If beam information is reported (block 209), the report may be generated in accordance with measurements of the beamformed RSs and transmitted by the third device for downlink beam training or the second device for uplink beam training. If the beam quality may be improved through beam refinement (block 211), which involves refining beam directions or widths, more beamformed RSs may be transmitted and may be possibly followed by additional reporting (blocks 209 and 211).

If the beams are suitable for communications, information regarding the beams may be conveyed by a network controller (e.g., the first device or a different device) for communications that follow (blocks 213 and 215). A motivation for beam indication may be that, during beam training when the beamformed RSs are transmitted, a receiving device may also perform beamforming and obtain receive beams that permit the receiver to receive the beamformed RSs with the highest quality. Hence, information regarding transmit beams applied for a certain communications enables the receiving device to assume corresponding spatial filtering for reception of signals, which may comprise applying corresponding receive beams. As an example, a UE may observe during the beam training process with a TRP that the UE can receive an RS beamformed with a first transmit beam (TxB1) using a first receive beam (RxB1) and an RS beamformed with a second transmit beam (TxB2) using a second receive beam (RxB2). Then, when the TRP sends information about the first transmit beam TxB1 for a communication, the UE may use the first receive beam RxB1 in order to receive the communication with good quality. Similarly, when the TRP sends information about the second transmit beam TxB2 for a communication, the UE may use the second receive beam RxB2 in order to receive the communication with good quality. The information about beam pairing (transmit beam and receive beam pairing) may or may not be shared between the UE and the TRP. If the information about beam pairing is not shared, the UE may store the information locally without reporting it to the TRP.

Furthermore, each of TxB1, RxB1, TxB2, and RxB2 in the above example may be, in general, a plurality of beams instead of a single beam. A plurality of beams may be applied by a plurality of antenna panels for transmission or reception of a signal or a plurality of signals. An association between beams and antenna panels may, in general, depend on hardware configurations, which may or may not be known to other communication entities. Similarly, an association between beams and signals or between antenna panels and signals may, in general, depend on a transmission mode and may or may not be fully known to other communication entities.

Due to UE mobility, objects in the environment, weather changes, and so on, beams determined at a particular time instance may experience signal degradation or may expire. Hence, the quality of the beams may be continually or periodically monitored, and the beam information may be updated by refining old beams or obtaining new beams. As an example, the quality of the beams may be checked (block 217), by comparing the quality with one or more thresholds. If the quality of the beams is good, then communications may continue. If beam refinement is needed, beamformed RSs may be transmitted and additional reporting may be performed (blocks 207 and 209). If reconfiguration is needed, beam reconfiguration, beamformed RS transmissions, and reporting may be performed (blocks 205, 207, and 209).

In the 3GPP NR specifications, CSI acquisition and BM share a common framework referred to as the CSI framework. Indeed, a majority of BM-related content in the 3GPP NR specification reuses CSI acquisition terminology and processes. As an example, a beam report may be a CSI report where the reported quantity includes an index to one or more reference signals and the quality of the one or more reference signals. In this example, because the reference signal is transmitted through a beam, the reported index conveys information about the beam. Therefore, in the rest of this discussion, phrases such as BM resource, BM report, and BM process may be used instead of CSI resource, CSI report, and CSI process, respectively.

FIG. 2B illustrates a CSI configuration framework 250. The network configures components of a CSI acquisition (or BM) process, including M CSI resource settings 255, and N reporting settings 260, where M and N are non-negative integer values. Each CSI resource setting comprises S resource sets 270, where S is a non-negative integer value. Resource set 1 includes $K_1$ resources, resource set 2 includes $K_2$ resources, . . . , and resource set S includes $K_S$ resources, where $K_1, K_2, \ldots, K_S$ are non-negative integer values. It is noted that the resource sets may have differing numbers of resources. Resources in each resource set may comprise CSI reference signals (CSI-RSs) or synchronization signal blocks (SSBs), with each SSB including synchronization signals and an associated physical broadcast channel (PBCH). Each reporting setting may include the quantity to be reported. Example quantities for beam reporting are reference signal indices, which may include CSI-RS resource indices (CRIs) or SSB resource indices (SSBRIs), and their quantities in the form of, e.g., a Layer 1 reference signal received power (L1-RSRP). Example quantities for a CSI report include a channel quality indicator (CQI), a precoding matrix indicator (PMI), a rank indicator (RI), and so forth. A reporting setting may also include links to resources, which may convey which resources should be used for measurements to produce which reports.

In the 3GPP NR specifications, each resource setting and each reporting setting is associated with a bandwidth part (BWP) through its identifier (ID) in a band (or a component carrier (CC) in the case of carrier aggregation (CA)). It is conveyed in the measurement configuration whether the measurement is for channel state or interference. Subsequent to the configurations, RSs may be transmitted, measured, and reported. As an example, in the downlink, downlink RSs are transmitted by network entities, such as TRPs, the RSs are measured by a UE, and the UE produces and transmits reports. The beamforming information obtained by these beamforming procedures may be used along with other CSI by the network or the UE for later communications. The beamforming information may also be referred to as spatial information.

Acquisition and conveyance of spatial information corresponding to analog beamforming is enabled in the 3GPP NR specification through introduction of a new type of quasi-collocation (QCL) relationship. In general, a QCL relationship between two or more antenna ports conveys that certain large-scale parameters of a channel can be inferred from one antenna port for another.

The 3GPP NR specifications Release 15 has defined four types of QCL relationship:

QCL Type A: QCL relationship with respect to {Doppler shift, Doppler spread, average delay, delay spread};

QCL Type B: QCL relationship with respect to {Doppler shift, Doppler spread};

QCL Type C: QCL relationship with respect to {Doppler shift, average delay}; and QCL Type D: QCL relationship with respect to {Spatial Rx parameter}.

QCL Type D, also referred to as spatial QCL, is defined in the 3GPP NR specifications, allowing a UE to infer spatial beamforming information for the reception of a signal. The conveyance of the QCL relationship for a data transmission, such as a transmission on a physical downlink shared channel (PDSCH) or a physical uplink shared channel (PUSCH), may be performed through a prior control transmission, such as a transmission on a physical downlink control channel (PDCCH).

Although the current definition of spatial QCL in the 3GPP NR specifications is limited to QCL Type D, which is meant to abstract various receive (Rx) parameters such as a direction and a width of a beam, alternative types of spatial QCL are also possible in principle that would allow the distinguishing of different spatial beamforming parameters. As an example, a more specific type of QCL may be defined to specify a direction of a beam but not a width of the beam. The more specific types of spatial QCL are not yet defined in the 3GPP NR specifications, but the example embodiments presented herein are applicable to any and all such extensions in the future.

Furthermore, in the discussion presented herein, QCL is used instead of spatial QCL although a main focus of the discussion is spatial QCL. It is noted that information regarding spatial QCL may typically be sent from a network entity (such as a TRP) to a UE following beam training procedures.

It is noted that the 3GPP NR specifications has devised limited ways to communicate UE capabilities in terms of hardware resources for simultaneously receiving signals that have different QCL relationships, i.e., the UE capabilities are transmitted to the UE through different beams. It was mentioned before that the number of distinct simultaneous beams may be limited to the number of antenna panels. When a TRP does not know the number of antenna panels at a UE, in principle, it may co-schedule either a lower or higher number of signals for the UE than the number of antenna panels, hence either underutilizing the UE's hardware capabilities (when a lower number of signals are scheduled) or causing beamforming conflicts at the UE (when a higher number of signals are scheduled), respectively.

An antenna panel may be a physical panel with multiple antenna elements mounted thereon. In a simple case, an antenna panel may be a single antenna connected to a radio frequency (RF) chain. An RF chain for receiving signals may include a low-noise amplifier, an analog to digital converter (ADC), and so forth. An RF chain for transmitting signals may include a digital to analog converter (DAC), a power amplifier, and so forth. The antenna may have a field pattern allowing the antenna to amplify signals received from certain directions and attenuate signals received from other directions. Similarly, if the antenna is used for a transmission, an antenna pattern may show directions where the signal is transmitted at higher strengths compared to other directions. If an antenna pattern is directional in a certain plane, beamforming from or to different directions may be possible on that plane through electrical or mechanical means of beamforming.

An extension of the single antenna element antenna panel may be a collection of antenna elements connected to an RF chain through a mixer that combines the signals when receiving or a splitter that replicates a signal when transmitting. By applying phase shifts to different antenna elements, the antenna panel may be able to form beams towards different directions. In practice, the number of phase shifts on each phase shifter may be limited and the phase shifting state of a plurality of phase shifters may be controlled digitally by a beamforming controller. A communication system at the baseband may not be aware of the actual phase shifts or the geometry of the resulting beam directions, but only communicate indices with the beamforming controller that correspond to different phase shifting states. Antenna elements may be mounted on a panel to form a linear array, a planar array, a circular array, or other shapes that provide a desired overall beamforming pattern.

A possible variation of the previously presented antenna panel is the number of beamforming controllers. According to this variation, an antenna panel is not necessarily a physical panel separate from other panels, but is instead distinguished by a degree of freedom in applying simultaneous beams. Then, for example, if elements on a panel are controlled by two beamforming controllers, this may be called a two-panel system meaning that two beams can be simultaneously formed by its antenna elements.

Another possible variation of the above definition of an antenna panel is the number of RF chains. According to this variation, an antenna panel is distinguished by a separate RF chain providing a signal to or from the baseband system. Yet another possible variation may involve the combining of different criteria, such as the number of beamforming controllers or the number of RF chains. Such a variation may be useful for antenna architectures where an antenna element may be connected to more than one RF chain. An example of such an architecture is a fully inter-connected architecture where every antenna element is connected to every RF chain through a mixer or a splitter.

It is noted that other variations of antenna panels are not precluded. For example, a device may determine its number of antenna panels based on a signal processing capability solely, or in combination with its antenna and RF capabilities. Any interpretation of an antenna panel, whether physical or virtual, and, consequently, a number of antenna panels in a device may be a representative of the device's hardware or software capability in receiving or transmitting signals, applying beams, signal processing at the baseband, and so forth.

Therefore, as presented herein, an antenna panel may be used as a generalization to an antenna, an antenna element, an array or a plurality of antennas or antenna elements, an antenna structure with an RF chain, an antenna structure with a baseband signal processor at hardware or software level, a degree of freedom in beamforming control, a phase shifting line or a plurality of phase shifting lines connected to an antenna structure, and so on.

An antenna panel may be referred to as an antenna port, a virtual antenna port, a set of antennas, a set of virtual antennas, a set of antenna ports, and so on.

Currently, the 3GPP NR specifications define QCL rules for signals that are multiplexed simultaneously, e.g., scheduled on the same orthogonal frequency-division multiplexing (OFDM) symbols. For example, according to the 3GPP NR Release 15 specification, if a CSI-RS and an SSB are multiplexed on the same symbol, the two signals should be QCL'ed from the perspective of the UE. Those rules are established generally based on the assumption that a UE may not have more than one antenna panel and, as a result, may not be able to simultaneously receive any two non-QCL'ed signals.

As described herein, the example embodiments utilize CA terminology and refer to different parts of the aggregate communications band as CCs. An example scope of the discussion is the so-called intra-band CA where different parts of a band are served by different CCs transmitted from the same or different remote radio heads (RRHs). The example embodiments, however, are not limited to intra-band CA or other types of CA and may be applicable to different bandwidth parts (BWPs) or other forms of split spectrum resources. Therefore, the discussion of intra-band CA should not be construed as being limiting to either the scope or spirit of the example embodiments. It is also noted that despite the recurring reference to the 3GPP NR specifications and terminology, the example embodiments are not limited to communications systems compliant with the 3GPP NR specifications.

Figure 3:
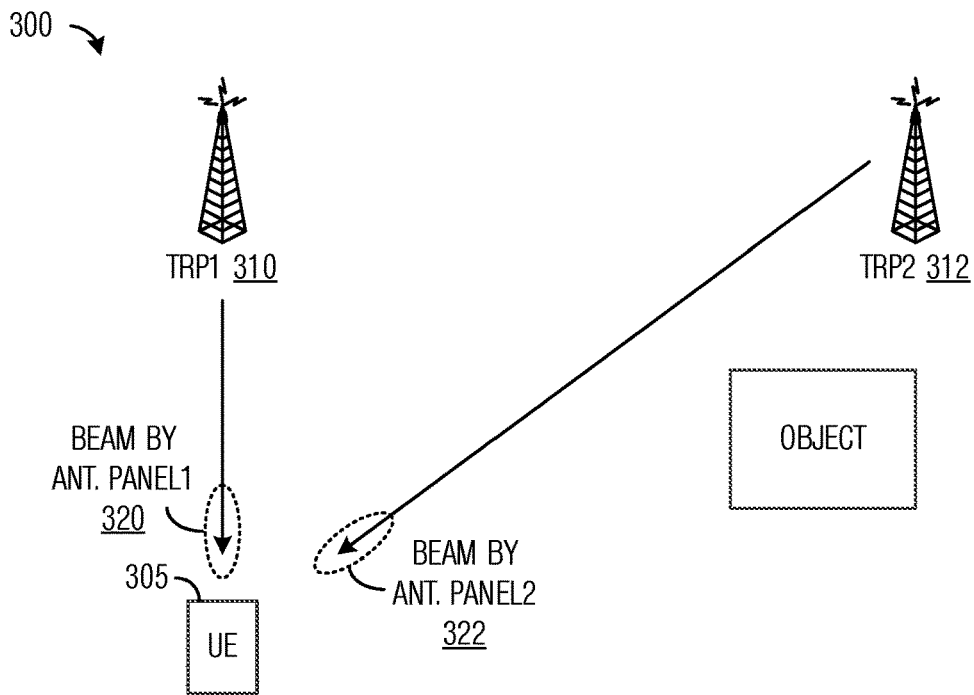
FIG. 3 illustrates an example communications system highlighting the use of multiple antenna panels at a UE according to example embodiments described herein.

FIG. 3 illustrates an example communications system 300 highlighting the use of multiple antenna panels at a UE. Communications system 300 includes a UE 305 served by a plurality of TRPs, such as TRP 310 and TRP 312. TRPs 310 and 312 are transmitting to UE 305. UE 305 uses a first antenna panel "ANT. PANEL1" to receive a transmission from TRP 310 and a second antenna panel "ANT. PANEL2" to receive a transmission from TRP 312. The first antenna panel generates a beam 320 and the second antenna panel generates a beam 322. Beams 320 and 322 may be transmit beams, receive beams, or a combination thereof. Although shown in FIG. 3 as using the antenna panels to receive, UE 305 may also use the antenna panels to transmit to the TRPs. An antenna of a TRP towards which a first antenna panel of UE 305 may form a beam may be different, in general, from an antenna of a TRP towards which a second antenna panel of UE 305 may form a beam. The antennas of the TRP(s) may not be collocated and may belong to different TRPs at different geographical locations.

Figure 4:
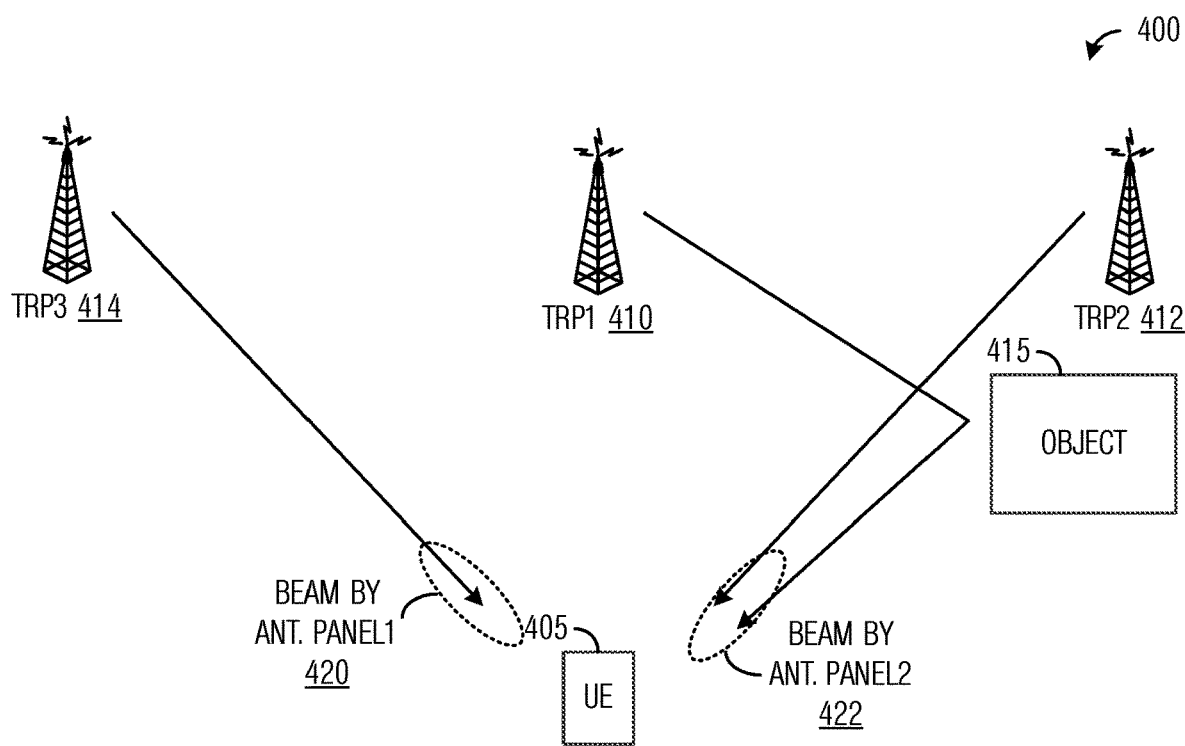
FIG. 4 illustrates an example communications system highlighting the use of multiple antenna panels at a UE to receive transmissions from more TRPs than available antenna panels according to example embodiments described herein.

FIG. 4 illustrates an example communications system 400 highlighting the use of multiple antenna panels at a UE to receive transmissions from more TRPs than available antenna panels. It is noted that depending on the location of the TRPs and the scattering environment, it is possible for a UE to use a single antenna panel to receive or transmit multiple signals. Communications system 400 includes a UE 405 served by a plurality of TRPs, such as TRP 410, TRP 412, and TRP 414. Communications system 400 also includes an object 415 that is reflective in nature. As shown in FIG. 4, a first antenna panel "ANT. PANEL1" of UE 405 receives a transmission from TRP 414, while a second antenna panel "ANT. PANEL2" receives a direct transmission from TRP 412 and an indirect transmission from TRP 410 that has reflected off object 415. The first antenna panel generates a beam 420 and the second antenna panel generates a beam 422. Beams 420 and 422 may be transmit beams, receive beams, or a combination thereof. Although shown in FIG. 4 as using the antenna panels to receive, UE 405 may also use the antenna panels to transmit to the TRPs.

The reception (or transmission) of signals from (or to) TRP 410 and TRP 412 by ANT. PANEL2 spares ANT. PANEL1 for other communications purposes, e.g., searching for signals from other TRPs (e.g., TRP 414) in order to evaluate possible handover opportunities, performing measurements on signals from other TRPs, connecting to or resuming communications with another TRP (e.g., TRP 414) to improve a quality of service (QoS) criterion, and so forth.

It is noted that signals received from quasi-collocated antennas are supposed to share certain large-scale features, such as spread quantities. The quasi-collocated relationship is typically a result of antennas being deployed at geographically close locations, e.g., antennas mounted on the same RRH or another network entity. However, spatial QCL relationship does not need signals with the QCL relationship to be originated from antennas in close proximity as long as the rays received from the antennas are received with a common receive beam of a UE.

In order to take advantage of an available antenna panel, the network should have knowledge that the UE has an excess, unused antenna panel. Therefore, there is a need for new signaling procedures and protocols to inform the network of such an available antenna panel. Furthermore, the knowledge of availability of unused antenna panels at the UE during certain periods may provide the opportunity for the UE to perform tasks such as radio link monitoring (RLM) tasks that would be otherwise infeasible. In this context, words such as "available," "unused," and "excess" may be used interchangeably in this document.

It is noted that the domain of applicability of the technique is much wider than the systems and methods disclosed herein, which is described with the available antenna panel communicating with a single TRP. The communications, as described herein, may occur on several BWPs, several CCs, either in a CA mode or a dual connectivity (DC) mode. Therefore, the discussion of a single antenna panel communicating with a single TRP should not be construed as being limiting to either the scope or spirit of the example embodiments.

According to an example embodiment, a system and method for detecting, signaling, and utilizing available antenna panels of a UE are provided. In an embodiment, the detection of an available antenna panel may be based on a number of signals received by a beam. In general, if more signals are received than beams used to receive the signals, then the UE may have at least one available antenna panel. As an illustrative example, a UE is able to detect one or more available antenna panels by detecting that rays from two or more signals are received by a correspondingly smaller number of beams, with the number of available antenna panels being equal to the number of rays minus the number of beams.

In an embodiment, the UE informs a TRP of its capability to receive a certain maximum number of non-QCL'ed signals. Let N represent the maximum number of signals that the UE can receive. N may generally depend on the UE hardware, its distance to the TRP, the application or scenario, or other factors. For example, N is normally smaller than or equal to degrees of freedom that the RF frontend of a UE provides for beamforming. As another example, a UE sufficiently close to a TRP may be able to receive different signals through different antenna panels while a UE more distant from the TRP may have to combine signals it receives from multiple antenna panels in order to obtain sufficient signal strength. In yet another example, a UE that is in the line of sight (LOS) of a TRP may consider a different number of antenna panels available compared to a UE that is not in the LOS of the TRP due to a difference in signal strengths.

A general procedure in a baseline embodiment is as follows: A network and a UE are first made aware of a maximum number of antenna panels N that the UE can use for communications in a downlink or an uplink or both. Communications and measurements such as beamforming training and CSI acquisition may then proceed as usual. During a connection, if the UE notifies the network that a beam report or a CSI report is obtained through a reduced number of antenna panels, the TRP may send instructions to the UE on how to use excess antenna panels for other tasks. It is noted that, although described for a single-TRP system, communications may involve multiple TRPs, e.g., using coordinated multipoint (CoMP) techniques, carrier aggregation or dual connectivity techniques, or other methods.

In an embodiment, the UE signals an availability of one or more available antenna panels to the network and the network responds with signaling conveying how the UE is to make use of the one or more available antenna panels. As an illustrative example, the UE sends a multi-value field set to a first value if an available antenna panel is available and a second value if an available antenna panel is not available. It is noted that if there are multiple available antenna panels, additional values may be used to convey a number of available antenna panels. As an example, the four-value field may be set to:
  first value: one available antenna panel;
  second value: two available antenna panels;
  third value: three available antenna panels; and
  fourth value: no available antenna panels.
It is noted that other values are possible. The number of values, and consequently the size of the field, may be determined by a number of antenna panels N of a UE or may be constrained by the technical standard.

In an embodiment, for each available antenna panel or a subset of available antenna panels, the network may send information specifying how the UE is to use the available antenna panel(s). In an embodiment, the information for each available antenna panel or each subset of available antenna panels is sent in separate messages. In an embodiment, the information for all available antenna panels is sent in a single message.

Figure 5:
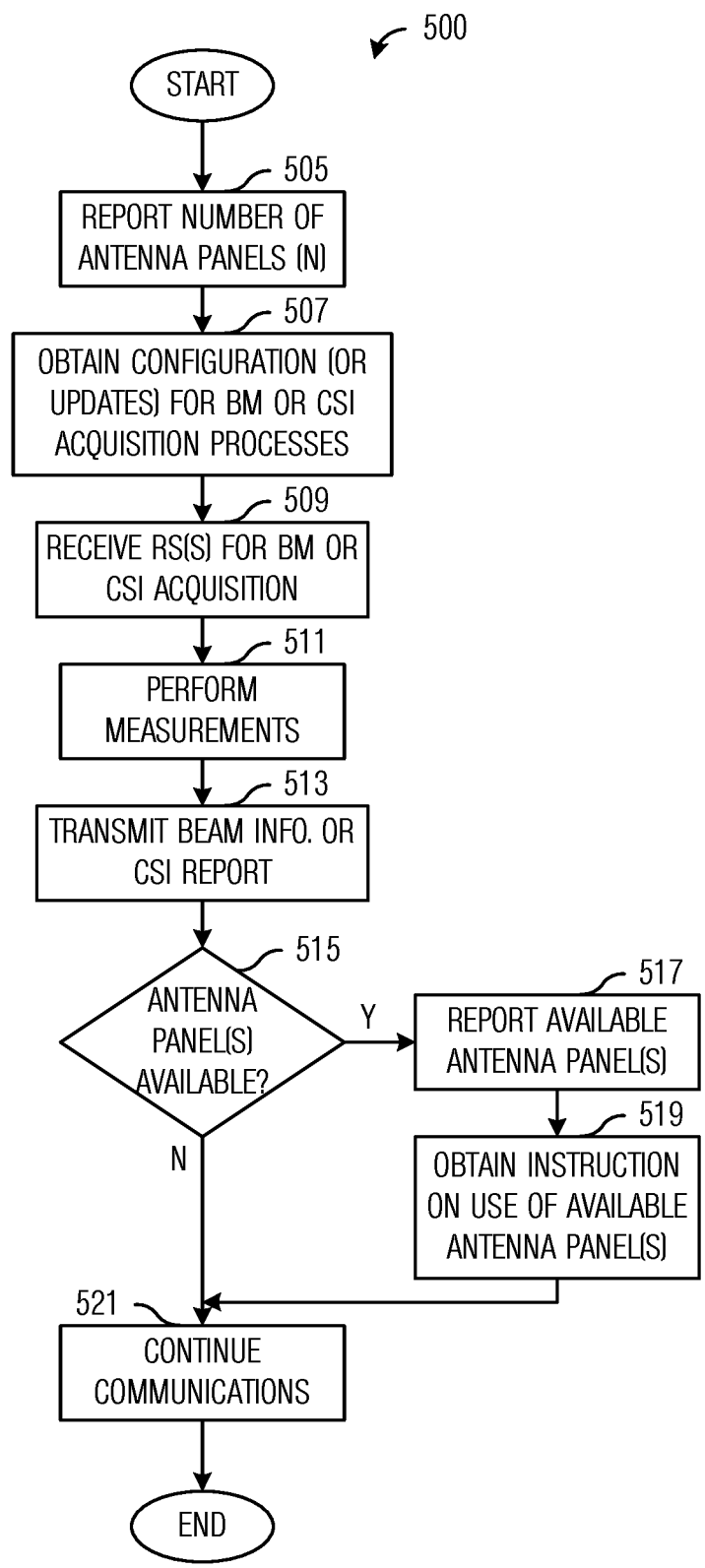
FIG. 5 illustrates a flow diagram of example operations occurring in a UE according to example embodiments described herein.

FIG. 5 illustrates a flow diagram of example operations 500 occurring in a UE. Operations 500 may be indicative of operations occurring in a UE as the UE detects, signals, and utilizes available antenna panels.

Operations 500 begin with the UE reporting a maximum number of antenna panels (N) that the UE can use for communications in a downlink (DL) or an uplink (UL) or both (block 505). The reporting of the maximum number of antenna panels may be explicit or implicit. If the UE informs the network (e.g., an access node serving the UE) that it possesses the ability to communicate using multiple beams at a time, the network may infer that the UE has sufficient hardware to support the feature. A relatively simple implementation is that the UE reports to the network that it is capable of communicating using N beams simultaneously if the UE has at least N antenna panels, each of which controlled by a separate phase-shifter controller.

It should be appreciated that, although the example embodiments are described as N being the number of antenna panels, other variations are possible, e.g., a situation where an antenna panel comprises multiple physical antenna panels used jointly, for instance, in order to improve signal quality. In this context, a "number of antenna panels" more generally may mean a "number of degrees of freedom" in applying independent beams in a downlink or an uplink or both. As a result, this number may be variable during the operation of a system based on a signal quality, which may in turn change based on, for example, distance from a UE to a TRP. For instance, a signal quality at the UE at the edge of a cell may yield a smaller N compared to when the UE is close to the TRP of the cell.

As an example, the number of antenna panels may be communicated explicitly with the UE reporting a number of antenna panels using control signaling at a time of connection automatically or as a response to a request from a network. The number of antenna panels may be communicated explicitly with the UE using a field in a radio resource control (RRC) signaling, e.g., before accessing the mmWave band. The network may send an RRC message to request the UE to report the number of antenna panels that the UE is capable of supporting. In an embodiment, the UE may distinguish between a number of antenna panels for a downlink and a number of antenna panels for the uplink, which may be possibly different. In such a case, the number of panels may be reported for the downlink only, for the uplink only, or for both the uplink and downlink.

In an embodiment, the reporting of multi-antenna panel capability may not contain the maximum number of antenna panels N, but may inform the network of the possibility of implementation of the example embodiments without knowledge of N. The information may be, for example, conveyed explicitly by one or more bits in a message field from the UE or inferred by the network through other communications with the UE. For example, a field with example possible values 'ON' and 'OFF' in a message from the UE may inform the network whether the UE is or is not capable of implementing the example embodiments presented herein. Alternatively, a technical standard may allow the network to assume, by default, that all UEs connected to the system, all UEs of a certain generation of the standard, all UEs belonging to a certain category or application or use case, and so on, possess the capability. Then, if a UE is allowed to not possess the capability, a designated value in a response to a network request to perform a multi-antenna panel operation may inform the network that the UE does not possess the capability assumed by default.

As an alternative to an explicit indication, the number of antenna panels may be communicated implicitly. In such a situation, the reporting of the maximum number of antenna panels N is optional or is not defined in the communications protocol. Instead, the network may be able to obtain this information through implicit methods, e.g., through a UE report. For example, the UE may signal in a report that it has used separate antenna panels for obtaining and measuring beams, which implies that a maximum number of panels at least as large as the number of beams reported in the report is available at the UE. Alternatively, the network may schedule communications with the UE without possessing a knowledge of whether the UE is capable of other communications or performing measurements in a measurement gap simultaneously. A report of multi-antenna panel capability may not contain the maximum number of antenna panels N, but may inform the network of the possibility of implementation of the proposed embodiments without knowledge of N.

The UE obtains a configuration (or a configuration update) for BM or CSI acquisition processes (block 507).

The UE may receive configurations (or configuration updates) from the network (such as a TRP or access node) for one or more BM or CSI acquisition processes. The configurations (or configuration updates) are received in messages that may be transmitted in one or more control messages. In a situation where more than one control messages are sent, the control messages may be distributed in time, transmitted across CCs, and so on. The one or more control messages may include information about where the CSI-RS signals or SSB signals are located (in terms of network resources) using an existing method defined in 3GPP NR Release 15 or similar methods. The one or more control messages may be sent using RRC signaling, for example, but methods using other signaling such as a medium access control (MAC) signaling or a downlink control information (DCI) signaling is not precluded.

Generally, the configurations may be transmitted and updated at different times including in between other steps. As an example, one or more configurations (or configuration updates) may be transmitted before each transmission of reference signals or each UE reporting instance. Additionally, more than one TRP may transmit configurations (or configuration updates) and reference signals. This variation is suitable for multi-TRP communications. In a situation with cross-CC BM and CSI acquisition, configurations (or configuration updates) may be transmitted on one or more CCs. Furthermore, the control messages may include a request to attempt to reduce the number of antenna panels used. When the UE receives such a control message, the UE will attempt to use fewer antenna panels. An option for the UE to respond to the network request is to use alternative beams, possibly with different beamwidths that increase the probability of simultaneously receiving rays from multiple signals through a single beam.

The configurations (or configuration updates) may include a requested or recommended number of antenna panels for reports. In this situation, a reported maximum number of panels N may not be a choice of solely the UE, but may be requested or recommended by the network, for example, as a parameter contained in a resource configuration, a reporting configuration, or a measurement configuration.

The UE receives reference signals for BM or CSI acquisition (block 509) and performs measurements based on the reference signals (block 511). The network (e.g., TRP(s), access node(s), etc.) transmits the reference signals. The transmission of the reference signals may use existing 3GPP NR Release-15 procedures, for example. In general, BM and CSI acquisition may include multiple transmissions of reference signals by at least one TRP and a reporting of measurements thereof by at least one UE. An example of multiple-step BM is when each BM process refines beams obtained from a previous BM process. Another example is BM for multiple TRPs where one or more BM processes are associated to beams from or to a TRP in a set of TRPs. Each BM process, which includes transmission of reference signals followed by measurements and possibly reporting by a UE, may be preceded by its own configuration(s) as described previously.

In a situation with cross-CC BM, reference signals may be transmitted on one or more downlink CCs and one or more reports may be transmitted on one or more uplink CCs, possibly associated with the one or more downlink CCs.

A TRP may typically acquire CSI corresponding to formerly acquired beams by at least one CSI acquisition process, but other variations are not precluded. In general, CSI acquisition may include at least one transmission of reference signals by a TRP and at least one measurement and reporting by a UE. As an example, when multiple BM processes (identical or similar to BM steps) are executed, each BM process may be followed by a CSI acquisition process. As another example, CSI acquisition for multiple TRPs occurs when one or multiple CSI acquisition processes are associated to channel state or interference from a TRP in a set of TRPs. Each CSI acquisition process, which includes transmission of reference signals followed by measurements and possibly reporting by a UE, may be preceded by its own configuration(s) as described previously.

In a situation with cross-CC CSI acquisition, reference signals may be transmitted on one or more downlink CCs and one or more reports may be transmitted on one or more uplink CCs, possibly associated with the one or more downlink CCs. As described previously, the beams used for transmission of the reference signals may be obtained from a preceding BM process, but other variations are not precluded.

Additionally, as described previously, a CSI acquisition process may be optional because the information obtained from a BM process may be sufficient for the network. Indeed, the network may simply choose to apply analog beams associated with the reported reference signal indices, e.g., values of a CRI, and apply digital beamforming obtained from the combination of reference signal qualities, e.g., corresponding values for RSRP.

The UE transmits beam information or a CSI report (block 513). When the UE has received the reference signals and has made measurements, the UE determines how to perform receive beamforming (also commonly referred to as spatial filtering) and send information about whether all of the antenna panels are used to generate a report. As an illustrative example, if rays from two or more signals may be received through a single beam, the UE may determine that it has at least one available antenna panel. It is noted that the UE may not obtain an unused antenna panel by mere selection of beams that are optimal in the sense of maximizing a performance criterion such as a communication rate, but may instead need to perform signal processing operations and computations to attempt to limit the number of antenna panels that it uses at a given time. Such an attempt may comprise, for example, applying a possibly suboptimal subset of beams that may aim to cover an angular area that is suitable for reception of more than one signal. The UE performs a check to determine if an antenna panel(s) is available (block 515). As an example, if the UE determined that rays from two or more signals may be received through a single beam, the UE determines that an antenna panel is available. It is noted that although an antenna panel (or a plurality of antenna panels) are determined to be available, it does not necessarily mean that the antenna panel is currently not being used. An antenna panel being available means that the antenna panel is available for re-assignment to another task.

If an antenna panel is available, the UE transmits a report about the available antenna panel(s) (block 517). As mentioned earlier, the report may not simply be the result of mere checking the availability of unused antenna panels when optimal beams are selected, but may instead be the result of a deliberate attempt to use a subset of antenna panels by selecting a suboptimal subset of beams. In this case, the UE may be allowed to, preferred to, or mandated to associate a report of antenna panel availability with a report of resulting performance or resulting performance loss. This information may then be used by the network to decide whether using the available antenna panel(s) for other communication purposes is beneficial in the sense of improving an overall performance criterion, such as a minimum data rate, minimum QoS requirements, minimum latency, minimum link reliability, and so forth. As an alternative to an overall performance criterion, the decision may be made on an impact that the use of the available antenna panel(s) has on the performance of the communications system. In other words, the decision may be made on the change in the performance of the communications system, such as a change in a data rate, a change in QoS metrics, a change in latency, a change in link reliability, and so on. As an alternative, the UE may make a decision by itself or according to a minimum performance criterion requested by the network, such as a minimum data rate, minimum QoS requirements, minimum latency, minimum link reliability, and so forth, or a change in a performance criterion. In an embodiment, the UE may report to the network that a beam report (containing possibly suboptimal beam information) allows unused antenna panels while still maintaining an estimated performance meeting a minimum performance criterion, or may otherwise report to the network that all tested suboptimal beam combinations may result in an unacceptable performance loss, e.g., performance falling below the minimum performance criterion, or unacceptable change in a performance criterion, e.g., a performance criterion drops by more than a specified threshold. It is noted that the term "tested" as used above may refer to computed and estimated performance of beam combinations and not necessarily to performance measurements by actual communications through the beam combinations.

In example embodiments presented herein, a performance criterion may be a rate, a delay or latency, a link reliability, or another performance criterion. A performance criterion may instead be a combination, for example a weighted linear combination, of a multitude of performance criteria. When putting a constraint on a performance criterion, for example as part of a request from the network, the constraint may be directly on a value of the performance criterion or on a difference between values of the performance criterion. Alternatively, a constraint may be on a function of the performance criterion or on a quantity from which the performance criterion may be obtained. An example of such a constraint is a constraint on a channel condition from which a rate may be obtained or estimated. In this case, the network may accompany a request with a constraint on the channel condition rather than the resulting rate instead. The constraint may be communicated to the UE or may, instead, be used by the network for computations and decision making without communicating it to the UE.

The report about the available antennal panel(s) may be sent by RRC signaling or MAC signaling or DCI signaling, may be carried on a PUSCH or a PUCCH, or may be sent by other methods. A new PUCCH format may be used in order to enable transmission of available antenna panel information through a PUCCH, or an existing format may be modified to contain the available antenna panel information. In a simple situation, the message to report available antenna panels may be a field (e.g., a first value (such as "1") reports presence of available antenna panels and a second value (such as "0") reports lack of available antenna panels). In this example, as an option, when the field is equal to "0", the field may not be sent to limit signaling overhead. Other options are presented below.

As an alternative, a UE may perform measurements and send n pieces of beam information or CSI reports to the network. Each piece of beam information or CSI report (referred to herein as $R_i$) may be accompanied by a number of antenna panels ($N_i$) used to produce $R_i$ where $1 \leq i \leq n$ denotes the index of a piece of reported information. Furthermore, each piece of beam information may be associated with a performance estimate as described previously. It is noted that each piece of information may be in a separate report or multiple pieces may be jointly sent in one report.

The UE may report beam information or CSI, with each piece of the information produced by using a first subset of the N antenna panels that is mutually exclusive with a second subset of the N antenna panels used for producing another piece of the information. In this case, the network may infer that multiple communications can be simultaneously scheduled with the UE, with each communication based on information obtained from a separate beam information or CSI. Alternatively, multiple report messages may be produced by the UE, with each report containing one or multiple pieces of beam information or CSI, while the pieces of information in each report are obtained by measurements through mutually exclusive subsets of the UE's N antenna panels. Then, the network may infer that combinations of the reported information from one report can be used to co-schedule communications with the UE, but reported pieces of information may not be combined when contained in more than one report.

Additionally, the UE may include in reports a field that informs the network which pieces of information can be combined. This field may be, for example, an index reporting or indicating a partitioning of the N antenna panels. Then, pieces of beam information that contain an identical value for the field will belong to mutually exclusive subsets (i.e., partitions) of the total N antenna panels and can, therefore, be combined by the scheduler or some other function of a network entity when co-scheduling communications with the UE. This method can be used as an alternative to the aforementioned implicit method of indicating partitions by combining pieces of beam information in one report. Then, for example, the network may infer that it can co-schedule communications associated with reports that have the field value equal to "1", can co-schedule communications associated with reports that have the field value equal to "2", and so forth, but cannot co-schedule communications associated with reports that have different values for the field because such a co-scheduling may result in a beam indication conflict at the UE.

It is possible for the report to not contain a number of antenna panels $N_i$. In this case, it may be sufficient for the network to obtain knowledge of which pieces of information can be combined in order to co-schedule communications as described previously. Information such as the rank of communication for each scheduled communication may then be obtained from a CSI field such as an RI or a PMI.

In an embodiment, instead of reporting numbers such as N and $N_i$ for different values of i, the UE may report a set of antenna panel indices or port numbers P and subsets $P_i$ of the antenna panel indices or port numbers for different values of i, respectively. Similarly, as an alternative to a requested or recommended number of antenna panels for a measurement or report, a certain subset of antenna panels may be requested or recommended, respectively, for a measurement or report. In this case, a number of antenna panels $N_i$ may be the cardinality of the subset $P_i$.

The UE obtains instructions regarding the use of the available antenna panel(s) (block 519). The instructions may be received in an RRC message, a MAC message, or a DCI message, for example, and may utilize an existing signaling procedure or a modified signaling procedure. For discussion purposes, consider a situation where the network is interested in transmitting n signals that are not necessarily QCL'd for the UE. For example these signals may include reference signals such as CSI-RS, data channels such as PDSCH, or control channel such as PDCCH signals that are not QCL'd (including those originating from different TRPs). The signals may originate from the same TRP or from different TRPs. The network may be interested in knowing which of the n signals the UE can receive simultaneously and how many antenna panels the UE will use for this. It may also be beneficial for the network to know which antenna panels are used for receiving which signals.

In an embodiment, the network constructs reference signals corresponding to each of the n signals so that they can be transmitted simultaneously (e.g., on different resource elements on the same OFDM symbol. The configuration for transmitting the reference signals is transmitted to the UE using a control channel, such as a PDCCH. The n reference signals are configured and transmitted so that receiving a reference signal through a particular antenna panel, and possibly through a particular beam of the antenna panel, effectively implies the ability of the UE to receive the corresponding signal through the same antenna panel and possibly through the particular beam of the antenna panel. Such a combination of reference signals described above may be referred to as a composite probing reference signal, a composite reference signal, or a similar term.

Based on the configuration, the UE may attempt different combinations of antennas, or possibly different combinations of beams, perform measurements, and report to the network the best antenna panels, and possibly the best beams of those antenna panels, to simultaneously receive reference signals. As an example, the UE may attempt to receive as many of the n reference signals as it can. The UE may then report the information to the network. The UE may also send information about how many or which antenna panels are unused (i.e., the available antenna panels) if a particular combination of reference signals are to be received by the UE. The network may then schedule transmissions corresponding to the reported information.

The format and content of the UE report may differ. In an embodiment, the UE may include some or all of the following information in the UE report:

Information regarding which of the reference signals of the composite reference signal(s) can be simultaneously received;

Information of which UE antenna panels are used for receiving the reference signals or information of which UE antenna panels are used for receiving which ones of the reference signals;

Information of which transmit or receive beams are used for receiving the reference signals or information of which transmit or receive beams are used for receiving which ones of the reference signals;

Information of which antenna panels are unused, or may be unused, for receiving the reference signals.

The information regarding unused antenna panels may be used by the network for different purposes, such as allowing time gaps for performing RLM tasks by the UE, enabling or initiating multi-CC or multi-TRP measurements or communications, and so forth. A use case of particular interest for multi-CC operation is when available antenna panels are used for co-scheduling communications on a second one or more CCs where co-scheduled communications on the second one or more CCs may require the use of separate antenna panels due to a difference in air interface numerologies, a difference in symbol timings due to a difference in propagation delays, and so forth, among the CCs.

The UE may generate and transmit one or more reports in a single message or in a plurality of different messages. In the situation where multiple combinations of antenna panels or beams are reported for a certain subset of reference signals or the composite reference signal(s), the network may leverage the flexibility in co-scheduling the transmissions corresponding to the conveyed reference signals while improving some criteria such as reducing interference for UEs in a neighboring cell.

It is noted that if the UE wants to, or if the network requests the UE to, attempt different beam combinations in addition to attempting different antenna panel combinations, the network may configure and transmit multiple replicas of each composite reference signals. The replicas may, for example, be transmitted on consecutive OFDM symbols. An alternative includes transmitting replicas on corresponding OFDM symbols in multiple consecutive or non-consecutive slots, subframes, frames, and so forth. Another alternative is to include information of which OFDM symbols carry which replicas explicitly. Other alternatives are not precluded.

Furthermore, a composite reference signal or each replica of a composite reference signal may span more than one OFDM symbol. Hence, the signals on each OFDM symbol may be transmitted through different transmit beams. Then, if the UE includes, in the report, an index to an OFDM symbol in a composite reference signal, the transmitter will further be informed which beam combination over an antenna panel combination is the most suitable for scheduling upcoming transmissions.

It is noted that, although the above embodiments are described for composite reference signals in a downlink, an uplink counterpart to the embodiments are also possible. For example, a network may configure an uplink composite reference signal or a plurality of uplink composite reference signals from a UE or a plurality of UEs. Then, the UE(s) may transmit uplink composite reference signals, possibly through different antenna panel combinations or through different beam combinations. A TRP or a plurality of TRPs may perform measurements through different antenna panel combinations or different beam combinations and use the measurement results to schedule upcoming transmissions in the uplink.

In both cases of downlink or uplink probing, a composite reference signal may be configured and transmitted to update existing probing information obtained through prior probing processes. For example, if a TRP is configuring composite reference signals for a first time for a particular UE or a particular combination of upcoming transmissions, it may want to allocate a certain number of resources, for example a certain number of OFDM symbols, in order to allow the TRP or the UE to sweep over a certain number of beam combinations. Later, if the TRP intends to only update the existing information, it may allocate a smaller number of resources, for example, a smaller number of OFDM symbols, that may allow or demand sweeping over a smaller number of beam combinations by the TRP or the UE.

In such embodiments, configurations of composite reference signals and corresponding reports may be common, hierarchical, or may otherwise share parameters in order to save signaling overhead. By way of example and not by way of limitation, a first level of configuration may include different parameters for configuration of composite reference signals, but may not include the number of OFDM symbols X that a composite reference signal spans or the number of replicas Y of the composite reference signal. Then, a second level of configuration may include values for X or Y. In some embodiments, X may correspond to a number of beam combinations that a TRP applies and Y may correspond to a number of beam combinations that a UE applies. Then, larger values for X or Y may be considered for a first probing and smaller values for X or Y may be considered for a later probing. By way of example and not by way of limitation, the first level of configuration may be in a configuration message by a higher layer such as an RRC message or a MAC message, and the second level of configuration may be in a configuration message or a triggering message by a lower layer such as a MAC message or a DCI message.

Additionally, if a level of reciprocity between a downlink channel and an uplink channel holds, information obtained through probing on the downlink may be reused for the uplink, or vice versa.

The UE continues communications (block 521). The communications continues using the antenna panels of the UE, as configured by the network.

If there are no antenna panels available (block 515), the UE continues communications (block 521). As an alternative, the UE sends a report to the network, implicitly or explicitly, that there are no available antenna panels.

Figure 6:
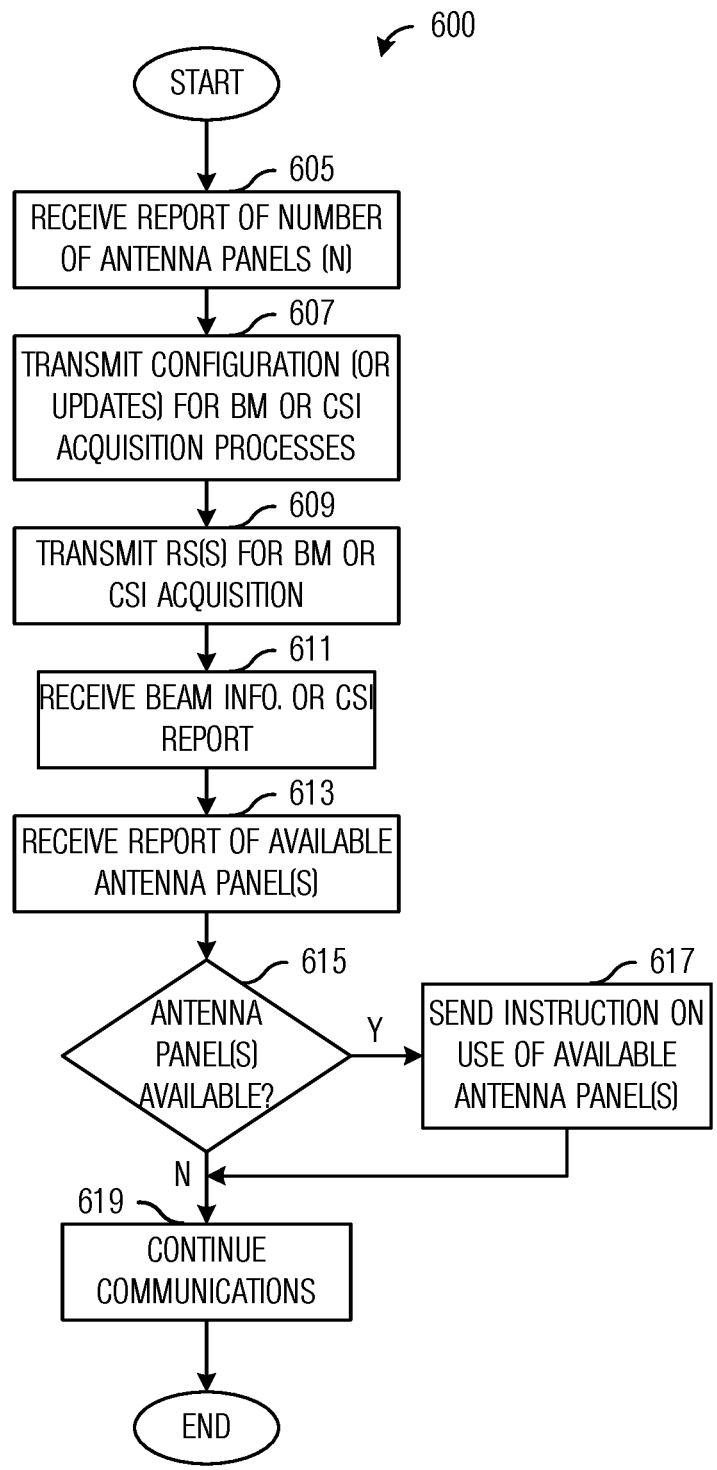
FIG. 6 illustrates a flow diagram of example operations occurring in a network entity according to example embodiments described herein.

FIG. 6 illustrates a flow diagram of example operations 600 occurring in a network entity. Operations 600 may be indicative of operations occurring in a network entity (such as an access node, a TRP, and so on) as the network entity communicates with a UE that detects, signals, and utilizes available antenna panels.

Operations 600 begin with the network entity receiving a report of a maximum number of antenna panels N that the UE can use for communications in a downlink, uplink, or both (block 605). The reporting of the maximum number of antenna panels may be explicit or implicit. The network entity generates and transmits a configuration (or a configuration update) for BM or CSI acquisition processes (block 607). The network entity transmits reference signals for BM or CSI acquisition (block 609). The network entity receives beam information or CSI report (block 611).

The network entity receives a report of available antenna panels (block 613). The report of available antenna panels may be a two-value field, which when set to a first value (such as "1") reports or indicates the presence of available antenna panels and when set to a second value (such as "0") reports or indicates the lack of available antenna panels, for example. In a situation when there are more than one available antenna panels, a multi-value field may be sent to report the number of available antenna panels. In an embodiment, only when there are available antenna panels the report of available antenna panels is transmitted. Hence, if the network entity does not receive a report of available antenna panels, it assumes that there are no available antenna panels.

The network entity performs a check to determine if an antenna panel(s) is available (block 615). If an antenna panel(s) is available, the network entity determines a use for the available antenna panel(s) and sends an instruction regarding the use of the available antenna panel(s) (block 617). It is noted that in a situation where there is a plurality of available antenna panels, each of the available antenna panels may be instructed to a different use. In other words, the available antenna panels may be used in different ways. The instructions may be sent in an RRC message, a MAC message, or a DCI message, and may utilize an existing signaling procedure or a modified signaling procedure. The network entity continues communications (block 619). The communications continue by using the antenna panels of the UE, as configured by the network entity. If there are no available antenna panels (block 615), the network entity continues communications (block 619).

Once the network receives information regarding the availability of excess or unused antenna panels from a UE, the network may use the information for different purposes. In an embodiment, the network may schedule the excess or unused antenna panels for measurement with TRPs other than the serving TRP, on CCs other than the primary CC, or otherwise measurements that allow the network to schedule transmissions from other TRPs, on other CCs, and so on. In another embodiment, the network may schedule or allow the UE to use its excess or unused panels to perform RLM measurements, provide information about handover opportunities, and so forth. In yet another embodiment, the network may keep the antenna panels unused in order to, for example, allow the UE to save power.

In general, once the UE informs the network of the maximum number of antenna panels N, there are different ways the maximum number of antenna panels N can be used. In an embodiment the UE is not expected to simultaneously receive more than N signals. In an OFDM-based air interface with a single numerology across a frequency band, simultaneously receiving N signals means receiving the N signals in the same OFDM symbol within that band. In the case of an OFDM-based air interface with multiple numerologies, simultaneously receiving N signals means receiving the N signals in OFDM symbols that overlap in time. Multiple signals that are scheduled to overlap in time are referred to as being co-scheduled. In the example embodiments, a scheduler is not expected to co-schedule more than N signals to be received by the UE at any point in time.

In an embodiment, a scheduler provisions time gaps for switching beams. In this embodiment, each time that a QCL relationship for a scheduled signal results in a change of a beam on an antenna panel, transmission of that signal should be preceded with a time gap $\Delta t$ during which a signal is not considered to be QCL'ed with any other signal. Any such time gaps should be counted towards the total number of co-scheduled signals, which is expected to not exceed N. The time gap can depend on a UE hardware, a network hardware, or other factors and may be fixed in a protocol, technical standard, or may be communicated prior to a scheduling.

An alternative to requiring a scheduler to avoid exceeding N co-scheduled non-QCL'ed signals for a UE is to allow co-scheduling more than N such signals, but do not expect the UE to receive more than N of the signals. Examples of different use cases and UE behaviors are as follows. One use case targets reducing a scheduler complexity. A scheduler may be responsible for scheduling traffic of different types, signals with different periodicities, signals with varying resources over time, and so forth. As a result, it may possible or even probable that occurrences of certain signals or channels overlap in time. One approach is for the scheduler to strictly avoid the number of co-scheduled non-QCL'ed signals to a UE that exceed N. This approach puts all of the burden on the scheduler through, for example, explicit signaling that changes the schedule for overlapping occurrences. However, if the behavior of a UE is determined for cases when a number of co-scheduled non-QCL'ed signals for a UE exceeds N, the UE behaves in a certain way in synchrony with the network without a need for explicit signaling. Another use case targets reducing the complexity of communications between different TRPs in multi-TRP scenarios. In this case, instead of explicit signaling from TRPs that require inter-TRP coordination, a UE behaves in a certain predetermined way known to the network either a priori or through preceding messages.

In an embodiment, if a UE is scheduled to simultaneously receive M non-QCL'ed signals, the UE ignores at most M-N of the signals, if M is greater than N. There are different methods to determine which signals to receive and which signals to ignore including the following non-exclusive cases:

One option is that a UE may ignore up to M-N signals of its choice. Succeeding signaling may inform the network which signals were chosen and received. Examples of the UE behavior with respect to ignoring different types of signals include: 1) not acknowledging when an ignored signal is from a control or data channel, 2) rate-matching around the ignored parts of a signal from a control or data channel, 3) not sending a report when an ignored signal is a measurement reference signal, and 4) explicit signaling that warns the network that certain signals were ignored.

Another option is to follow rules for prioritization between co-scheduled signals. One example is to ignore up to M-N latest scheduled signals. Another example is to ignore up to M-N earliest scheduled signals. A more general approach is to determine rules to prioritize between signals based on their type, behavior in the time domain, scheduling time, and so forth. For example: 1) control signals may take higher priority than data signals; 2) reference signals may take higher priority than control or data signals; 3) demodulation reference signals (DM-RS) may take higher priority than CSI-RS, which in turn, may take higher priority than tracking reference signals; and 4) aperiodic signals may take higher priority than semi-persistent signals, which in turn may take higher priority than periodic signals.

The prioritization rules may be static, i.e., predetermined by the protocol, or technical standard; may be dynamic, i.e., configurable by the network; or may be a combination of both static and dynamic rules. Examples of configuration of signal types by the network include: 1) the network sends messages that prioritize signals based on their type, behavior in the time domain, scheduling time, and so forth; 2) the network assigns a priority parameter to a signal as part of configuration for that signal.

In another embodiment, a UE does not necessarily ignore signals, but instead, it attempts to receive them without complying with the corresponding QCL relationships from the network. For example, if QCL relationships for the ignored signals need applying to certain beams on certain UE antennas for reception, the UE may still be able to receive the signals when not applying the beams on the antennas. The received signal may be interfered or weakened due to improper beamforming, but still decodable or usable towards combining with other signals, e.g., corresponding to other messages from the same hybrid automatic repeat request (HARQ) process. In addition, the network may be able to assess a signal quality degradation and take measures such as changing rates, transmission powers, and so forth in order to assist the UE to receive more signals successfully. This embodiment may be particularly useful for the cases that certain signals are not conveyed as having a QCL relationship, which would imply requiring identical beams, but require beams that are angularly adjacent.

The value of N may be constant for a certain UE or it may be variable. An example of a constant N is the UE's degree of freedom for RF (analog) beamforming, which may be equal to the number of antenna panels of the UE. An example of a variable N is where the UE uses multiple physical antenna panels to receive a weak signal at the cell edge while it may desire to use a lower number of physical antenna panels for a signal when it is closer to a TRP. In an embodiment, when the value of N is variable, the protocol may allow signaling for a UE's request to change N. The request may be triggered by reference signal measurements, errors in receiving messages, and so forth. In another embodiment, when a dynamic request to change N is not allowed, a UE may report to the network a minimal or maximal value for N.

In yet another embodiment, the value of N may be different for different types of signals. For example, signals that typically require better quality or are related to link robustness may require a smaller N. Examples are smaller N for control compared to data or smaller N for reference signals or synchronization signals compared to control or data signals.

There are considerations for the uplink dual to the above presented example embodiments, namely, a UE's capability to transmit multiple signals to TRP antennas that are applying different receive beams. One consideration is that if a UE capability is defined for the uplink dual, namely $N_{UL}$, and if $N_{DL}$ denotes the UE capability in the downlink, then $N_{UL}$ and $N_{DL}$ may not be equal in general due to factors such as power control, asymmetry in the number of transmit and receive antennas, and so forth. Furthermore, with regards to the aforementioned example embodiments that allow priorities for different downlink signals or channel, the associated uplink signals or channels may follow similar priorities. For example, if a CSI-RS takes a higher priority, then a linked CSI report may also take a higher priority. As another example, if a PDSCH takes a higher priority, then its hybrid automatic repeat request (HARQ) acknowledgement (ACK) may also take a higher priority.

Figure 7:
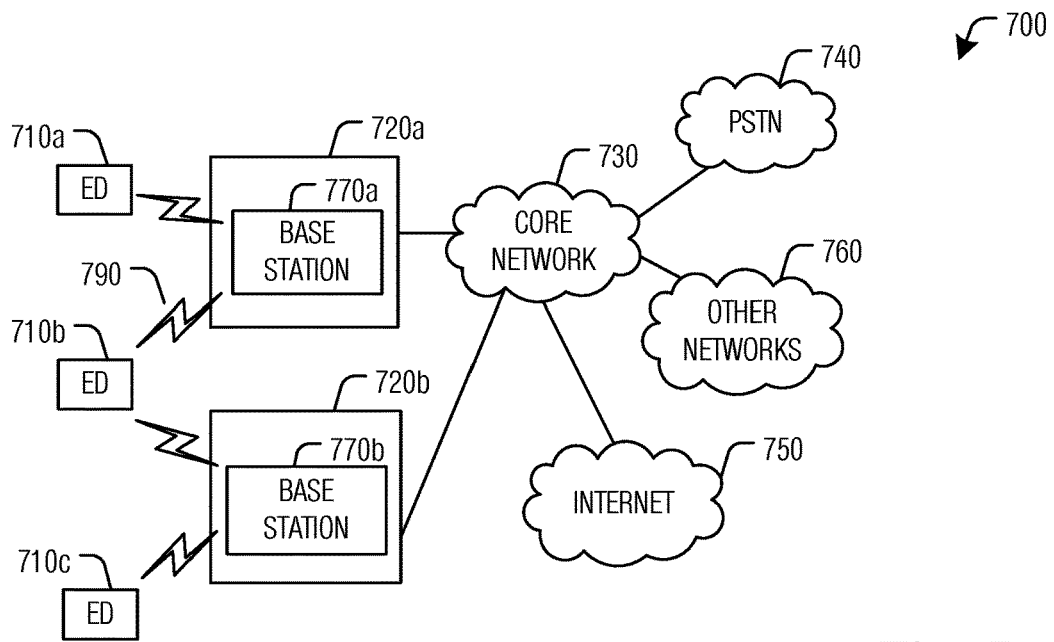
FIG. 7 illustrates an example communication system according to example embodiments described herein.

FIG. 7 illustrates an example communication system 700. In general, the system 700 enables multiple wireless or wired users to transmit and receive data and other content. The system 700 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 700 includes electronic devices (ED) 710a-710c, radio access networks (RANs) 720a-720b, a core network 730, a public switched telephone network (PSTN) 740, the Internet 750, and other networks 760. While certain numbers of these components or elements are shown in FIG. 7, any number of these components or elements may be included in the system 700.

The EDs 710a-710c are configured to operate or communicate in the system 700. For example, the EDs 710a-710c are configured to transmit or receive via wireless or wired communication channels. Each ED 710a-710c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 720a-720b here include base stations 770a-770b, respectively. Each base station 770a-770b is configured to wirelessly interface with one or more of the EDs 710a-710c to enable access to the core network 730, the PSTN 740, the Internet 750, or the other networks 760. For example, the base stations 770a-770b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 710a-710c are configured to interface and communicate with the Internet 750 and may access the core network 730, the PSTN 740, or the other networks 760.

In the embodiment shown in FIG. 7, the base station 770a forms part of the RAN 720a, which may include other base stations, elements, or devices. Also, the base station 770b forms part of the RAN 720b, which may include other base stations, elements, or devices. Each base station 770a-770b operates to transmit or receive wireless signals within a particular geographic region or area, sometimes referred to as a "cell." In some embodiments, multiple-input multiple-output (MIMO) technology may be employed having multiple transceivers for each cell.

The base stations 770a-770b communicate with one or more of the EDs 710a-710c over one or more air interfaces 790 using wireless communication links. The air interfaces 790 may utilize any suitable radio access technology.

It is contemplated that the system 700 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 720a-720b are in communication with the core network 730 to provide the EDs 710a-710c with voice, data, application, Voice over Internet Protocol (VoIP), or other services. Understandably, the RANs 720a-720b or the core network 730 may be in direct or indirect communication with one or more other RANs (not shown). The core network 730 may also serve as a gateway access for other networks (such as the PSTN 740, the Internet 750, and the other networks 760). In addition, some or all of the EDs 710a-710c may include functionality for communicating with different wireless networks over different wireless links using different wireless technologies or protocols. Instead of wireless communication (or in addition thereto), the EDs may communicate via wired communication channels to a service provider or switch (not shown), and to the Internet 750.

Although FIG. 7 illustrates one example of a communication system, various changes may be made to FIG. 7. For example, the communication system 700 could include any number of EDs, base stations, networks, or other components in any suitable configuration.

Figure 8A:
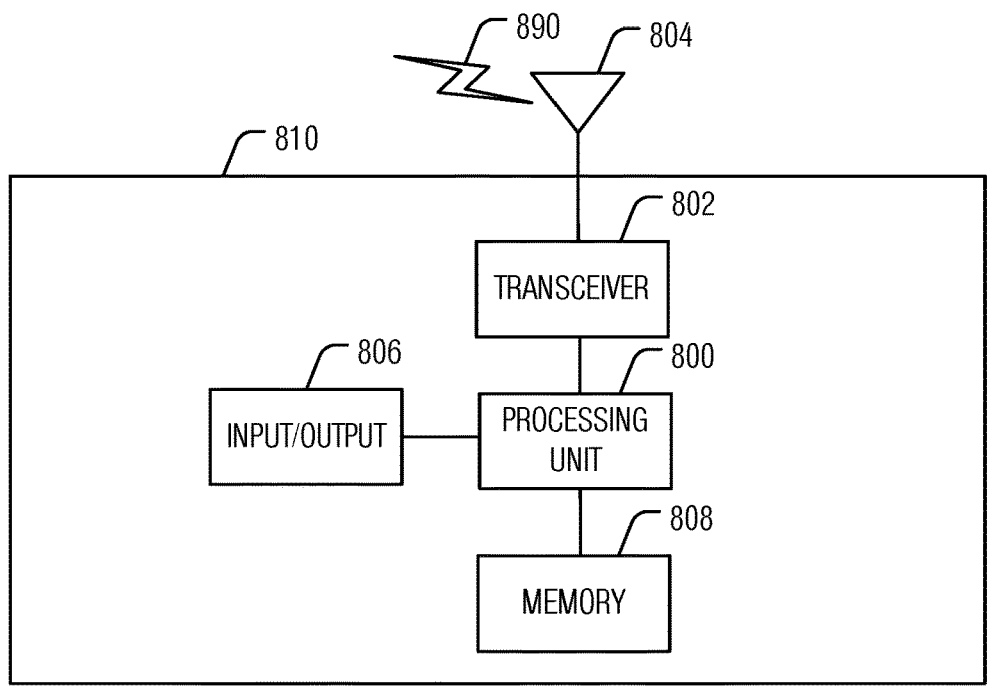
FIGS. 8A and 8B illustrate example devices that may implement the methods and teachings according to this disclosure.
Figure 8B:
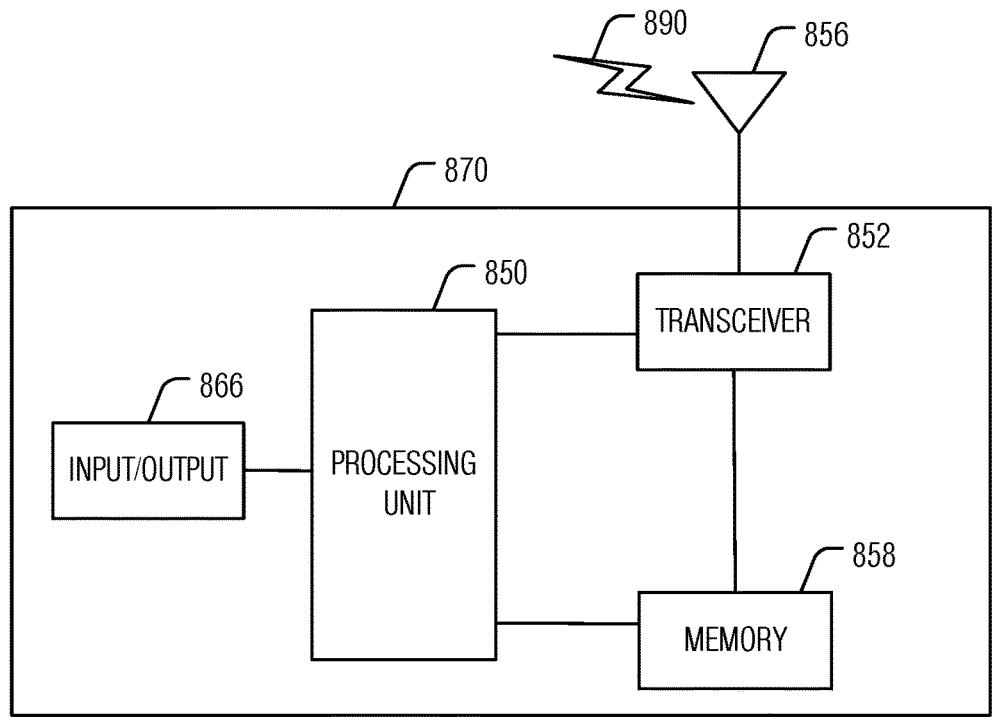

FIGS. 8A and 8B illustrate example devices that may implement the methods and teachings according to this disclosure. In particular, FIG. 8A illustrates an example ED 810, and FIG. 8B illustrates an example base station 870. These components could be used in the system 700 or in any other suitable system.

As shown in FIG. 8A, the ED 810 includes at least one processing unit 800. The processing unit 800 implements various processing operations of the ED 810. For example, the processing unit 800 could perform signal coding, data processing, power control, input/output processing, or any other functionality enabling the ED 810 to operate in the system 700. The processing unit 800 also supports the methods and teachings described in more detail above. Each processing unit 800 includes any suitable processing or computing device configured to perform one or more operations. Each processing unit 800 could, for example, include a microprocessor, microcontroller, digital signal processor, field programmable gate array, or application specific integrated circuit.

The ED 810 also includes at least one transceiver 802. The transceiver 802 is configured to modulate data or other content for transmission by at least one antenna or NIC (Network Interface Controller) 804. The transceiver 802 is also configured to demodulate data or other content received by the at least one antenna 804. Each transceiver 802 includes any suitable structure for generating signals for wireless or wired transmission or processing signals received wirelessly or by wire. Each antenna 804 includes any suitable structure for transmitting or receiving wireless or wired signals. One or multiple transceivers 802 could be used in the ED 810, and one or multiple antennas 804 could be used in the ED 810. Although shown as a single functional unit, a transceiver 802 could also be implemented using at least one transmitter and at least one separate receiver.

The ED 810 further includes one or more input/output devices 806 or interfaces (such as a wired interface to the Internet 750). The input/output devices 806 facilitate interaction with a user or other devices (network communications) in the network. Each input/output device 806 includes any suitable structure for providing information to or receiving information from a user, such as a speaker, microphone, keypad, keyboard, display, or touch screen, including network interface communications.

In addition, the ED 810 includes at least one memory 808. The memory 808 stores instructions and data used, generated, or collected by the ED 810. For example, the memory 808 could store software or firmware instructions executed by the processing unit(s) 800 and data used to reduce or eliminate interference in incoming signals. Each memory 808 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 8B, the base station 870 includes at least one processing unit 850, at least one transceiver 852, which includes functionality for a transmitter and a receiver, one or more antennas 856, at least one memory 858, and one or more input/output devices or interfaces 866. A scheduler, which would be understood by one skilled in the art, is coupled to the processing unit 850. The scheduler could be included within or operated separately from the base station 870. The processing unit 850 implements various processing operations of the base station 870, such as signal coding, data processing, power control, input/output processing, or any other functionality. The processing unit 850 can also support the methods and teachings described in more detail above. Each processing unit 850 includes any suitable processing or computing device configured to perform one or more operations. Each processing unit 850 could, for example, include a microprocessor, microcontroller, digital signal processor, field programmable gate array, or application specific integrated circuit.

Each transceiver 852 includes any suitable structure for generating signals for wireless or wired transmission to one or more EDs or other devices. Each transceiver 852 further includes any suitable structure for processing signals received wirelessly or by wire from one or more EDs or other devices. Although shown combined as a transceiver 852, a transmitter and a receiver could be separate components. Each antenna 856 includes any suitable structure for transmitting or receiving wireless or wired signals. While a common antenna 856 is shown here as being coupled to the transceiver 852, one or more antennas 856 could be coupled to the transceiver(s) 852, allowing separate antennas 856 to be coupled to the transmitter and the receiver if equipped as separate components. Each memory 858 includes any suitable volatile or non-volatile storage and retrieval device(s). Each input/output device 866 facilitates interaction with a user or other devices (network communications) in the network. Each input/output device 866 includes any suitable structure for providing information to or receiving/providing information from a user, including network interface communications.

Figure 9:
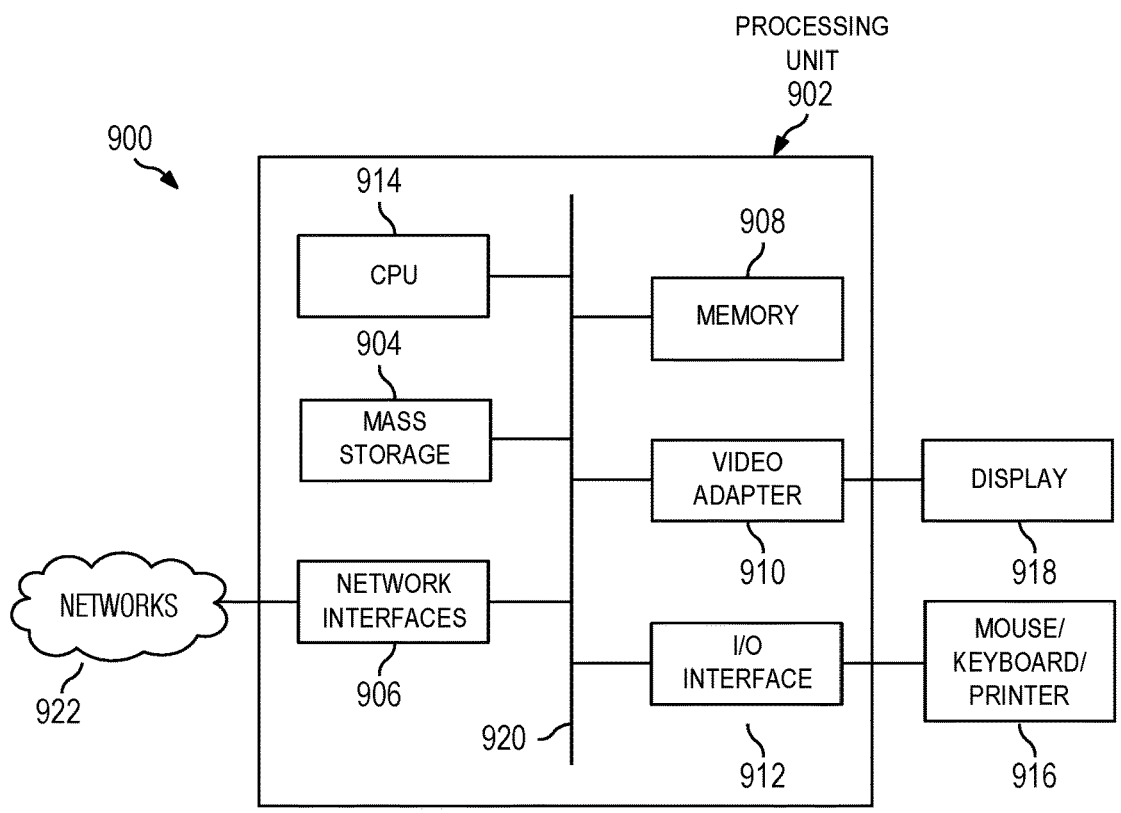
FIG. 9 is a block diagram of a computing system that may be used for implementing the devices and methods disclosed herein.

FIG. 9 is a block diagram of a computing system 900 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 900 includes a processing unit 902. The processing unit includes a central processing unit (CPU) 914, memory 908, and may further include a mass storage device 904, a video adapter 910, and an I/O interface 912 connected to a bus 920.

The bus 920 may be one or more of any type of several bus architectures including a memory bus or memory controller, a peripheral bus, or a video bus. The CPU 914 may comprise any type of electronic data processor. The memory 908 may comprise any type of non-transitory system memory such as static random access memory (SRAM), dynamic random access memory (DRAM), synchronous DRAM (SDRAM), read-only memory (ROM), or a combination thereof. In an embodiment, the memory 908 may include ROM for use at boot-up, and DRAM for program and data storage for use while executing programs.

The mass storage 904 may comprise any type of non-transitory storage device configured to store data, programs, and other information and to make the data, programs, and other information accessible via the bus 920. The mass storage 904 may comprise, for example, one or more of a solid state drive, hard disk drive, a magnetic disk drive, or an optical disk drive.

The video adapter 910 and the I/O interface 912 provide interfaces to couple external input and output devices to the processing unit 902. As illustrated, examples of input and output devices include a display 918 coupled to the video adapter 910 and a mouse, keyboard, or printer 916 coupled to the I/O interface 912. Other devices may be coupled to the processing unit 902, and additional or fewer interface cards may be utilized. For example, a serial interface such as Universal Serial Bus (USB) (not shown) may be used to provide an interface for an external device.

The processing unit 902 also includes one or more network interfaces 906, which may comprise wired links, such as an Ethernet cable, or wireless links to access nodes or different networks. The network interfaces 906 allow the processing unit 902 to communicate with remote units via the networks. For example, the network interfaces 906 may provide wireless communication via one or more transmitters/transmit antennas and one or more receivers/receive antennas. In an embodiment, the processing unit 902 is coupled to a local-area network 922 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit or module, a reporting unit or module, a performing unit or module, or an operating unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A computer implemented method for operating a user equipment (UE), the method comprising:
   performing, by the UE, measurements of received reference signals;
   determining, by the UE in accordance with the measurements of the received reference signals, that at least one antenna panel, which is currently-assigned to one radio link monitoring (RLM) task, is available for re-assignment to another RLM task, and based thereon
   sending, by the UE, a report to at least one access node indicating a number of antenna panels of the UE that are available for assignment to new RLM tasks.

2. The method of claim 1, further comprising:
   receiving, by the UE, an instruction to use at least one antenna panel for a new RLM task; and
   operating, by the UE, the at least one antenna panel for the new RLM task in accordance with the received instruction.

3. The method of claim 2, wherein the instruction is received from a first access node, and operating the at least one antenna panel for the new RLM task comprises measuring signals from a second access node.

4. The method of claim 1, wherein the measurements of the received reference signals comprise at least one of channel measurements, interference measurements, or beam measurements.

5. The method of claim 1, further comprising reporting, by the UE, at least one of the measurements of the received reference signals.

6. The method of claim 5, wherein the at least one antenna panel is associated with the at least one of the measurements of the received reference signals.

7. The method of claim 5, wherein the number of antenna panels of the UE that are available for assignment to new RLM tasks and the at least one of the measurements are reported in a message.

8. The method of claim 1, further comprising receiving, by the UE, a request to report the number of antenna panels of the UE that are available for assignment to new RLM tasks.

9. The method of claim 1, wherein the report indicating the number of antenna panels of the UE that are available for assignment to new RLM tasks is sent via a radio resource control (RRC) message.

10. The method of claim 1, wherein the report indicating the number of antenna panels of the UE that are available for assignment to new RLM tasks is sent via a physical uplink shared channel (PUSCH) or a physical uplink control channel (PUCCH).

11. A computer-implemented method for operating a first access node, the method comprising:
    transmitting, by the first access node, reference signals to a user equipment (UE);
    receiving, by the first access node, a report from the UE indicating a number of antenna panels of the UE that are available for assignment to new radio link monitoring (RLM) tasks, the number of antenna panels of the UE that are available for assignment to new RLM tasks being determined based on measurements of the reference signals transmitted to the UE is currently-assigned to one RLM task to another RLM task; and
    sending, by the first access node, an instruction to use at least one antenna panel for a new RLM task.

12. The method of claim 11, further comprising sending, by the first access node, a request to report the number of antenna panels of the UE that are available for assignment to new RLM tasks.

13. The method of claim 12, wherein the request is associated with a reporting of the measurements of the reference signals transmitted by the first access node.

14. The method of claim 13, wherein the measurements of the reference signals transmitted by the first access node comprise at least one of channel measurements, interference measurements, or beam measurements.

15. The method of claim 13, further comprising receiving, by the first access node from the UE, at least one of the measurements of the reference signals transmitted by the first access node.

16. The method of claim 15, wherein the at least one antenna panel is associated with the at least one of the measurements of the reference signals transmitted by the first access node.

17. The method of claim 15, wherein the number of antenna panels of the UE that are available for assignment to new RLM tasks and the at least one of the measurements are reported in a common message.

18. The method of claim 11, wherein the report is received in a physical uplink shared channel (PUSCH) or a physical uplink control channel (PUCCH).

19. The method of claim 11, wherein the report indicating the number of antenna panels of the UE that are available for assignment to new RLM tasks is received in an RRC message.

20. A user equipment (UE) comprising:
    a non-transitory memory storage comprising instructions; and
    one or more processors in communication with the memory storage, wherein the one or more processors execute the instructions to:
    perform measurements of in accordance with received reference signals,
    determine, in accordance with the measurements of the received reference signals, that at least one antenna panel, which is currently-assigned to one radio link monitoring (RLM) task, is available for re-assignment to another RLM task, and
    send a report to at least one access node indicating a number of antenna panels of the UE that are available for assignment to new RLM tasks.

21. The UE of claim 20, wherein the one or more processors further execute the instructions to receive an instruction to use the at least one antenna panel for a new RLM task, and operate the at least one antenna panel for the new RLM task in accordance with the received instruction.

22. The UE of claim 20, wherein the one or more processors further execute the instructions to report at least one of the measurements of the received reference signals.

23. The UE of claim 20, wherein the one or more processors further execute the instructions to receive a request to report the number of antenna panels of the UE that are available for assignment to new RLM tasks.

24. An access node comprising:
a non-transitory memory storage comprising instructions; and
one or more processors in communication with the memory storage, wherein the one or more processors execute the instructions to:
receive a report indicating a number of antenna panels of a user equipment (UE) that are available to new radio link monitoring (RLM) tasks, the UE determining in accordance with measurements of received reference signals by the UE, that at least one antenna panel, which is currently-assigned to one RLM task, is available for re-assignment to another RLM task; and
send an instruction on use of the at least one antenna panel.

25. The access node of claim 24, wherein the one or more processors further execute the instructions to send a request to report the number of antenna panels of the UE that are available for assignment to new RLM tasks.

26. The access node of claim 25, wherein the request is associated with a reporting of the measurements of the signals transmitted by the access node, and wherein the one or more processors further execute the instructions to receive a report of at least one of the measurements.

27. The access node of claim 25, wherein the request is associated with a reporting of the measurements of the signals transmitted by the access node, and wherein the one or more processors further execute the instructions to send reference signals.

\* \* \* \* \*

UNITED STATES PATENT AND TRADEMARK OFFICE
CERTIFICATE OF CORRECTION

PATENT NO. : 10,797,810 B2
APPLICATION NO. : 16/107326
DATED : October 6, 2020
INVENTOR(S) : Majid Ghanbarinejad et al.

Page 1 of 1

It is certified that error appears in the above-identified patent and that said Letters Patent is hereby corrected as shown below:

In the Claims

In Column 28, Lines 55-56, Claim 20, delete "perform measurements of in accordance with received reference signals" and insert --perform measurements of received reference signals--.

Signed and Sealed this
Fifteenth Day of December, 2020

Andrei Iancu
*Director of the United States Patent and Trademark Office*